(12) United States Patent
Morisawa et al.

(10) Patent No.: US 11,062,274 B2
(45) Date of Patent: Jul. 13, 2021

(54) MAINTENANCE PLANNING APPARATUS AND MAINTENANCE PLANNING METHOD

(71) Applicant: HITACHI, LTD., Tokyo (JP)

(72) Inventors: Toshihiro Morisawa, Tokyo (JP); Yasuharu Namba, Tokyo (JP); Toshiyuki Ukai, Tokyo (JP); Naohiro Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 216 days.

(21) Appl. No.: 16/223,147

(22) Filed: Dec. 18, 2018

(65) Prior Publication Data
US 2019/0236556 A1 Aug. 1, 2019

(30) Foreign Application Priority Data
Jan. 31, 2018 (JP) .............................. JP2018-015109

(51) Int. Cl.
*G06Q 10/00* (2012.01)
*G06Q 10/06* (2012.01)

(52) U.S. Cl.
CPC .......... *G06Q 10/20* (2013.01); *G06Q 10/067* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 2003/0149578 A1* | 8/2003 | Wong | G06Q 10/087 705/7.22 |
| 2006/0106626 A1* | 5/2006 | Jeng | G06Q 10/067 717/106 |
| 2008/0002995 A1* | 1/2008 | Kamisuwa | G03G 15/55 399/8 |
| 2009/0132321 A1 | 5/2009 | Kamisuwa et al. | |

(Continued)

FOREIGN PATENT DOCUMENTS

| | | |
|---|---|---|
| JP | 4237610 B2 | 3/2009 |
| JP | 2009-124677 A | 6/2009 |

(Continued)

OTHER PUBLICATIONS

Japanese Office Action received in corresponding Japanese Application No. 2018-015109 dated Feb. 2, 2021.

*Primary Examiner* — Sujay Koneru
(74) *Attorney, Agent, or Firm* — Mattingly & Malur, PC

(57) ABSTRACT

Various failure rates are supposed for each facility, and an optimal maintenance plan is made. A maintenance planning apparatus includes a failure rate model generation unit that generates a failure rate model on the basis of failure probability information which is set for an O&M asset by a user, a simulation execution unit that executes simulation regarding a failure which possibly occurs in the O&M asset in a plurality of different conditions on the basis of the generated failure rate model, a KPI computation unit that computes a KPI corresponding to each of the plurality of different conditions on the basis of results of the simulation, and an analysis unit that analyzes the plurality of different condi- (Continued)

tions and KPIs respectively corresponding to the plurality of different conditions, so as to determine an optimal condition corresponding to the best KPI.

14 Claims, 21 Drawing Sheets

(56) References Cited

U.S. PATENT DOCUMENTS

| | | | | |
|---|---|---|---|---|
| 2010/0250450 A1* | 9/2010 | Nishikawa | ............ | G06Q 10/067 705/302 |
| 2011/0166912 A1* | 7/2011 | Susumago | ......... | G06Q 10/0639 705/7.38 |
| 2011/0275364 A1* | 11/2011 | Austin | .................... | H04L 67/18 455/423 |
| 2012/0095734 A1* | 4/2012 | Moll | ...................... | G06Q 10/06 703/2 |
| 2013/0060933 A1* | 3/2013 | Tung | ................... | H04L 41/5025 709/224 |
| 2014/0358645 A1* | 12/2014 | Ehrman | ........... | G06Q 10/06393 705/7.39 |
| 2015/0112700 A1* | 4/2015 | Sublett | ............... | G06Q 30/0201 705/2 |
| 2016/0005242 A1* | 1/2016 | Hua | ...................... | G06Q 10/00 701/29.3 |
| 2016/0281607 A1* | 9/2016 | Asati | .......................... | F02C 6/18 |
| 2016/0292652 A1* | 10/2016 | Bowden, Jr. | ........... | G06Q 10/20 |
| 2016/0292802 A1* | 10/2016 | Tada | ........... | G06Q 10/0631 |
| 2016/0320768 A1* | 11/2016 | Zhao | ..................... | G05B 19/406 |
| 2017/0083822 A1* | 3/2017 | Adendorff | .......... | G05B 23/0278 |
| 2017/0123397 A1* | 5/2017 | Billi | ....................... | G05B 15/02 |
| 2017/0169143 A1* | 6/2017 | Farahat | ................... | G06F 30/20 |
| 2017/0309094 A1* | 10/2017 | Farahat | ................ | G07C 5/0841 |
| 2017/0323274 A1* | 11/2017 | Johnson | ............. | G06Q 10/0635 |
| 2018/0129195 A1* | 5/2018 | Lee | .............. | G05B 23/00 |
| 2018/0341255 A1* | 11/2018 | Turney | ............... | G05B 23/0283 |
| 2018/0342116 A1* | 11/2018 | Wang | ..................... | G06Q 10/20 |
| 2019/0146446 A1* | 5/2019 | Abernathy | ............. | G06Q 10/20 700/286 |
| 2019/0147387 A1* | 5/2019 | Fritz | ..................... | G06Q 30/02 705/7.14 |
| 2019/0236508 A1* | 8/2019 | Sage | ................ | G06Q 10/06393 |

FOREIGN PATENT DOCUMENTS

| | | |
|---|---|---|
| JP | 2011-060088 A | 3/2011 |
| JP | 2015-49606 A | 3/2015 |

* cited by examiner

PIECEWISE LINEAR FAILURE RATE MODEL

NUMBER OF SEGMENTS IS 1 OR MORE, AND HAS NO LIMITATION

FAILURE RATE CHANGE IN ONE SEGMENT

INC.: INCREASE, Increasing Failure Rate
CONST.: CONSTANT, Constant Failure Rate
DEC.: DECREASE, Decreasing Failure Rate

DEFINITION OF FAILURE RATE IN EACH SEGMENT

SETTING OF INCREMENT

RELIABILITY

FAILURE PROBABILITY

FAILURE DENSITY

FAILURE RATE

Fig. 13A SUMMARY OF METHOD OF OBTAINING RELATIONSHIP BETWEEN SIMULATION CONDITION AND KPI FOR OPTIMAL CONDITION RETRIEVAL
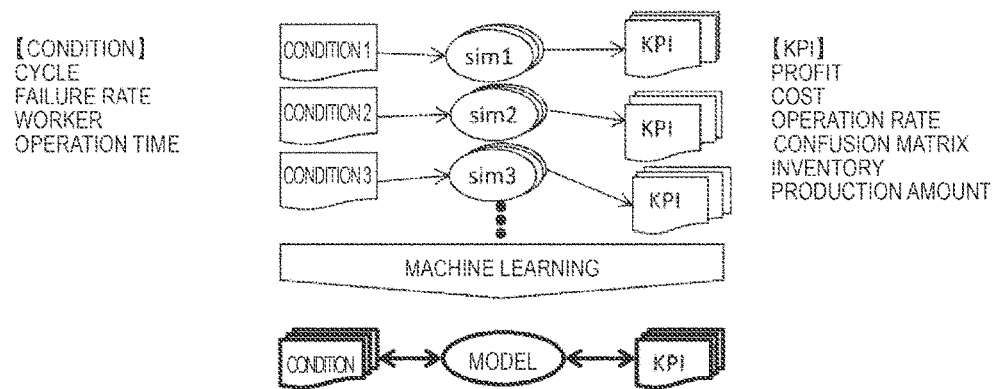
Fig. 13B WHAT CAN BE DONE WITH CONDITION-KPI RELATIONSHIP MODEL
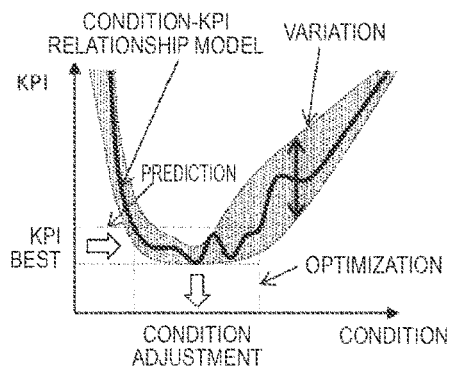

MAINTENANCE PLANNING APPARATUS AND MAINTENANCE PLANNING METHOD

TECHNICAL FIELD

The present invention relates to a maintenance planning apparatus and a maintenance planning method.

BACKGROUND ART

Various facilities such as air conditioners or elevators are operated in buildings such as offices, residential buildings, stations, or airports. The facilities deteriorate with the passage of operation time to reach a failure, and thus require appropriate maintenance. Similarly, moving objects such as vehicles typified by trucks or passenger cars, trains, ships, or airplanes deteriorate with the passage of operation time, and thus require appropriate maintenance. In performing such maintenance, it is necessary to make an efficient maintenance plan by taking an operation state, improvement of an operation rate, a cost reduction, and the like into consideration.

For example, PTL 1 discloses a technique in which the failure occurrence in a facility is fixedly evaluated, then the optimal maintenance cycle is calculated, and a failure which is different from a secular change is also analyzed on the basis of an operation record.

For example, PTL 2 discloses a technique in which the reliability of a component or an apparatus over the future is calculated assuming that a failure rate of each facility is constant, and an appropriate maintenance plan is created.

CITATION LIST

Patent Literature

PTL 1: Japanese Patent No. 4237610
PTL 2: JP-A-2011-60088

SUMMARY OF INVENTION

Technical Problem

There are various ways of occurrence of problems and failures which require maintenance, and a failure may occur even if maintenance is performed preventively. In other words, it is necessary to evaluate the occurrence of a problem or a failure and execution of maintenance by using a failure probability distribution (failure time distribution) of a system of a facility. In a case where the occurrence of a problem or a failure is probabilistic, maintenance cost or profits on business obtained through a facility operation also has a probabilistic variation.

However, in the technique disclosed in each of PTLs 1 and 2, a maintenance plan cannot be made by supposing various failure rates for each facility.

The present invention has been made in consideration of the circumstances, and an object thereof is to enable an optimal maintenance plan to be made by supposing various failure rates for each facility.

Solution to Problem

The present application includes a plurality of means for solving at least some of the above-described problems, and examples thereof are as follows. In order to solve the above problem, according to an aspect of the present invention, there is provided a maintenance planning apparatus including a storage unit that stores, as information which is possibly a condition, business entity information regarding a business entity including a customer company and a maintenance company, possessing information regarding an operation & maintenance (O&M) asset possessed by the customer company, configuration information regarding a configuration of the O&M asset possessed by the customer company, and maintenance method information regarding a maintenance method for the O&M asset; a failure rate model generation unit that generates a failure rate model on the basis of failure probability information which is set for the O&M asset by a user; a simulation execution unit that executes simulation regarding a failure which possibly occurs in the O&M asset in a plurality of different conditions on the basis of the generated failure rate model; a KPI computation unit that computes a key performance indicator (KPI) corresponding to each of the plurality of different conditions on the basis of results of the simulation; and an analysis unit that analyzes the plurality of different conditions and KPIs respectively corresponding to the plurality of different conditions, so as to determine an optimal condition corresponding to the best KPI.

Advantageous Effects of Invention

According to the present invention, it is possible to make an optimal maintenance plan.

Problems, configurations, and effects other than those described above will become clear through description of the following embodiments.

BRIEF DESCRIPTION OF DRAWINGS

FIGS. 13A-13B are diagrams for explaining a summary of a method of obtaining an optimal condition for making a KPI best.

DESCRIPTION OF EMBODIMENTS

Figure 1:
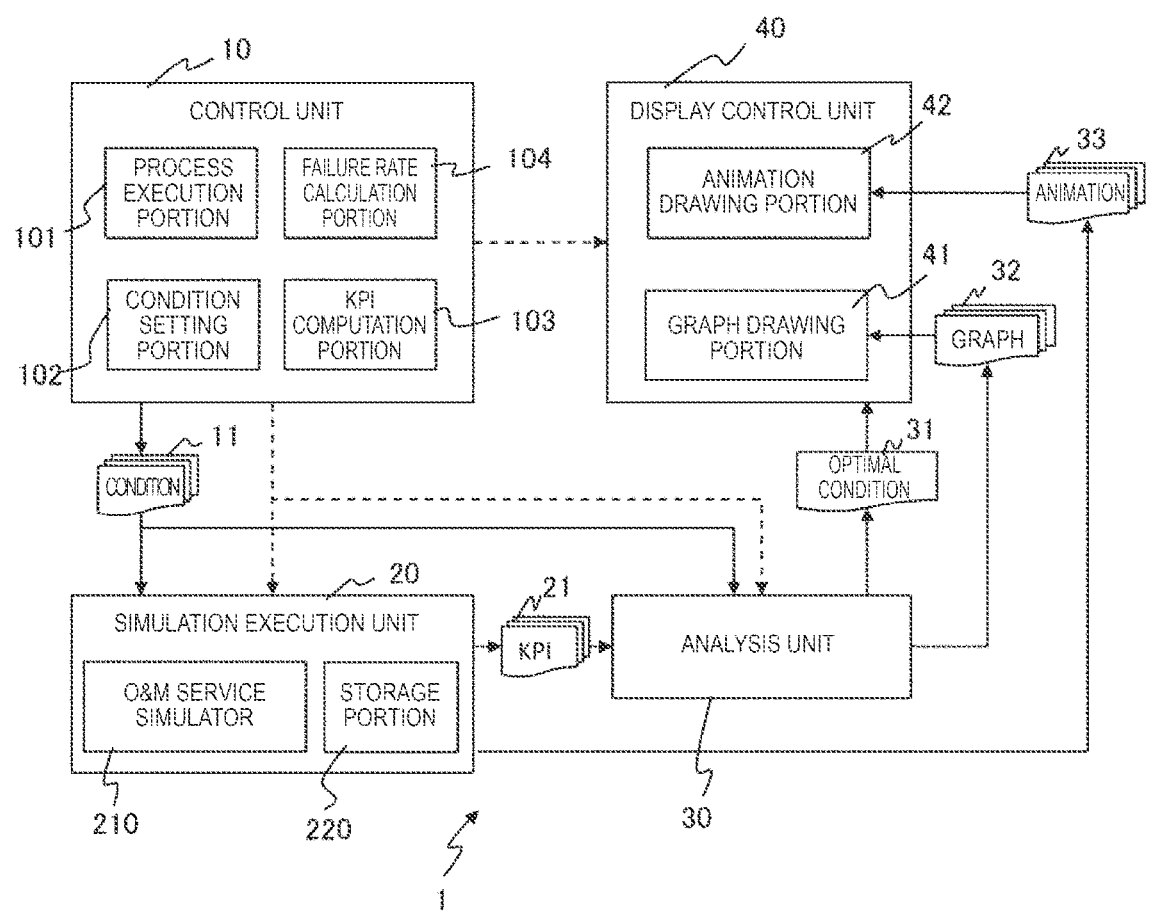
FIG. 1 is a block diagram illustrating a configuration example of a maintenance planning apparatus according to an embodiment of the present invention.

Hereinafter, an embodiment of the present invention will be described with reference to the drawings. The same reference numeral is given to the same member throughout all of the drawings for explaining an embodiment as a principle, and repeated description will be omitted. In the following embodiment, needless to say, a constituent element thereof (including an element step or the like) is not necessarily essential except for a case where the constituent element is particularly explicitly shown and a case where the constituent element is clearly essential in principle. Needless to say, the phrase "configured from A", "configured with A", "having A", or "including A" is not intended to exclude other elements except for a case where only an element is particularly explicitly shown. Similarly, in the following embodiment, a case where a shape, a positional relationship, or the like of a constituent element is described is assumed to include substantial approximates or similarities to the shape or the like except for a case where the shape or the like is particularly explicitly shown and a case where the constituent element does not clearly have approximates or similarities to the shape or the like in principle.

<Summary of Maintenance Planning Apparatus According to Embodiment of Present Invention>

First, a description will be made of a summary of a maintenance planning apparatus according to an embodiment of the present invention.

The maintenance planning apparatus makes an efficient maintenance plan for making a key performance indicator (KPI) best as business by evaluating profits obtained through a facility operation and cost of maintenance with respect to a plurality of types of maintenance methods in operation & maintenance (O&M) service business performed by a business entity which performs business by operating a facility, a maintenance business entity which performs maintenance, or a parts business entity which supplies maintenance parts.

As the plurality of types of maintenance methods, four types of methods such as breakdown maintenance (repair), scheduled maintenance, condition-based maintenance, and predictive maintenance are supposed.

A business entity performing facility operation business is a customer from the viewpoint of a maintenance business entity, and will thus be hereinafter referred to as a customer company. A facility is an asset which is an O&M target, and will thus be hereinafter referred to as an O&M asset. The O&M asset deteriorates due an operation thereof, and undergoes the occurrence of a problem or a failure.

The maintenance planning apparatus sets various maintenance methods and a problem occurrence probability in order to evaluate profits and cost of business. The maintenance planning apparatus obtains profits and cost of business by using an O&M service simulator which performs multi-agent simulation on promotion of business in a time series.

The maintenance planning apparatus sets an operation rate of an O&M asset, profits obtained through an operation, and cost required for maintenance as a KPI, and makes a maintenance plan by obtaining a condition in which maintenance makes the KPI best. In order to realize the condition-based maintenance and the predictive maintenance, a diagnosis service company (maintenance business entity) which monitors a facility state and performs anomaly detection and diagnosis services is set as a maintenance plan target.

A plurality of systems are set in an O&M asset, and the extent of deterioration and a failure rate are defined in each system. Various ways of the occurrence of failures are present in terms of probability, and are thus defined by a piecewise failure rate model (piecewise linear failure rate or a piecewise Weibull failure rate) in which a failure rate for any operation time is settable. A way of the occurrence of a failure is recognized as an operation time at the time at which the failure occurs and is generated as data in an actual facility operation environment, and thus a piecewise failure rate model is defined by setting a failure probability (time-to-failure probability) for operation time.

The O&M service simulator plans an operation of an O&M asset or a schedule of maintenance in a maintenance worker of a maintenance business entity, and simulates business according to the plan. A maintenance schedule is planned according to a plan of work or the occurrence of a problem or a failure, and thus all of the repair, the scheduled maintenance, the condition-based maintenance, and the predictive maintenance can be simultaneously performed in parallel in each O&M asset.

The occurrence of a problem or a failure in an O&M asset is probabilistic depending on a failure rate. As the occurrence of expenses varies due to the occurrence of a problem or a failure in a facility in reality, a result also varies for each execution of O&M service simulation. Thus, a relationship between a condition set in O&M service simulation and a KPI is modeled. A parameter of the model is obtained statistically through machine learning, and is used as a representative value. A variation range of the KPI obtained for the condition. An evaluation KPI model for evaluation is defined by using the representative value and the variation range in order to evaluate the good of the KPI in terms of an expected value and a risk of fluctuation. An optimal condition making the KPI best is explored on the basis of the evaluation KPI model.

As mentioned above, it is possible to make maintenance plans which are the optimum for business of various customers, O&M assets and maintenance business entities, systems of parts business entities, and business methods.

<Configuration Example of Maintenance Planning Apparatus According to One Embodiment of Present Invention>

FIG. 1 is a block diagram illustrating a configuration example of a maintenance planning apparatus according to an embodiment of the present invention. In FIG. 1, a dashed line indicates a flow of a control signal, and a solid line indicates a data flow (condition data 11 or the like).

The maintenance planning apparatus 1 includes a control unit 10, a simulation execution unit 20, an analysis unit 30, and a display control unit 40.

The control unit 10 controls each unit configuring the maintenance planning apparatus 1, and includes a process execution portion 101, a condition setting portion 102, a KPI computation portion 103, and a failure rate calculation portion 104.

The process execution portion 101 requests the simulation execution unit 20 to execute O&M service simulation (hereinafter, referred to as simulation as appropriate). The process execution portion 101 requests the analysis unit 30 to analyze a result of the simulation.

Figure 11:
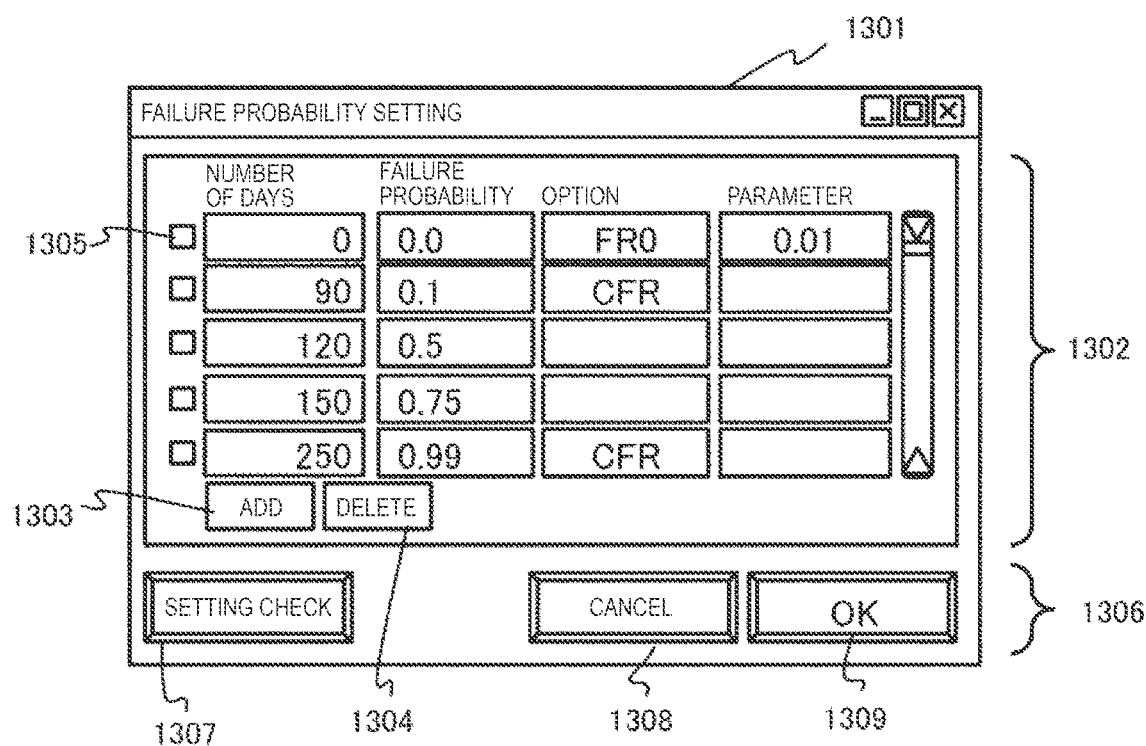
FIG. 11 is a diagram illustrating a first display example of a failure probability setting screen.

The condition setting portion 102 receives various conditions in simulation, which are entered from a user to a user interface such as a failure rate setting screen (FIG. 11). The condition setting portion 102 generates the condition data 11 corresponding to a received condition, and outputs the condition data 11 to the simulation execution unit 20 and the analysis unit 30. The condition data 11 also includes a failure rate calculated by the failure rate calculation portion 104. The condition data 11 also include information designating a KPI which is an evaluation target.

The KPI computation portion 103 computes a KPI 21 such as profits of a customer company or cost of maintenance on the basis of an execution result in an O&M service simulator 210, and outputs the KPI 21 to the analysis unit 30 via the simulation execution unit 20. The KPI computation portion 103 may be included in the simulation execution unit 20 instead of the control unit 10.

The failure rate calculation portion (corresponding to a failure rate model generation unit of the present invention) 104 generates a piecewise failure rate model by using failure rates corresponding to failure probabilities as various conditions in simulation.

The simulation execution unit 20 includes the O&M service simulator 210 and a storage portion 220. The simulation execution unit 20 executes simulation by using the O&M service simulator 210 in response to a request from the process execution portion 101. The simulation execution unit 20 acquires the KPI 21 corresponding to a simulation execution result from the KPI computation portion 103 of the control unit 10, and outputs the KPI 21 to the analysis unit 30. The simulation execution unit 20 outputs animation data 33 as an execution result of the O&M service simulation to the display control unit 40. The storage portion 220 stores various databases used for simulation.

The analysis unit 30 performs machine learning of the KPI 21 for the condition data 11, obtained from the simulation execution unit 20, so as to define a condition-KPI relationship model 1452 (FIGS. 13A-13B). The analysis unit 30 outputs optimal condition data 31, and graph data 32 presenting an analysis content to a user, obtained from the condition-KPI relationship model 1452, to the display control unit 40.

The display control unit 40 displays various pieces of information based on the optimal condition data 31 or the like on a display (not illustrated), so as to present the information to the user. The display control unit 40 includes a graph drawing portion 41 and an animation drawing portion 42. The graph drawing portion 41 displays a graph based on the graph data 32 on the display. The animation drawing portion 42 displays an animation based on the animation data 33 on the display.

Figure 2:
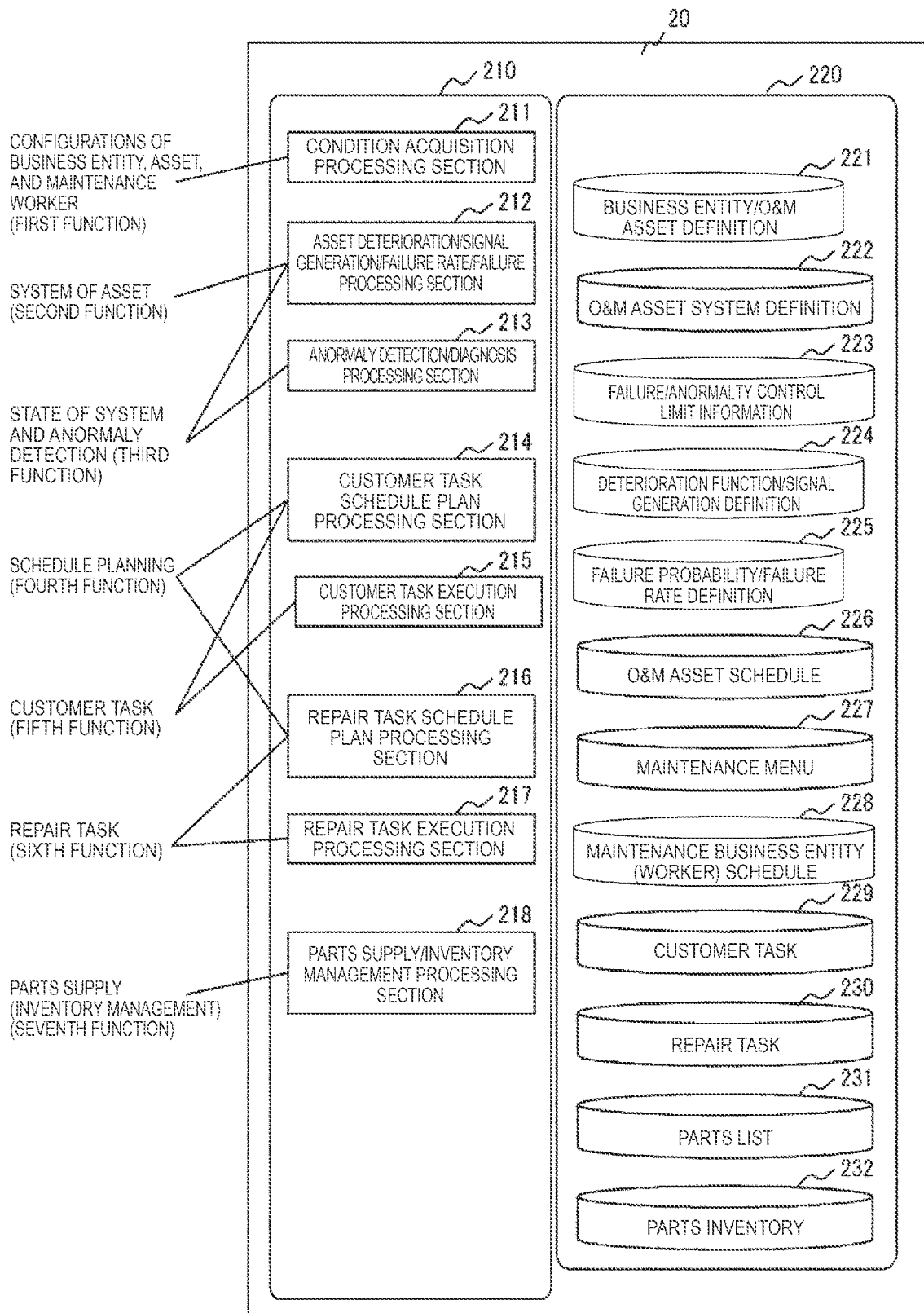
FIG. 2 is a block diagram illustrating detailed configuration examples of an O&M service simulator and a storage portion.

Next, FIG. 2 illustrates detailed configuration examples of the O&M service simulator 210 and the storage portion 220 of the simulation execution unit 20.

The O&M service simulator 210 has seven functions described below.

The seven functions are a first function of defining configurations of a business entity which is a simulation target agent, an O&M asset, and a maintenance worker; a second function of defining a system of an O&M asset; a third function of defining a system state and anomaly detection; a fourth function of planning a schedule of a customer task indicating an operation of an O&M asset which is work of a customer company and a schedule of a repair task indicating maintenance or repair of an O&M asset which is work of a maintenance service company; a fifth function of defining a customer task and causing a customer company to perform the customer task; a sixth function of defining a repair task and causing a maintenance service company to perform the repair task; and a seventh function of managing, supplying, and procuring parts used for maintenance.

In order to realize the above-described seven functions, the O&M service simulator 210 includes a condition acquisition processing section 211, an asset deterioration/signal generation/failure rate/failure processing section 212, an anomaly detection/diagnosis processing section 213, a customer task schedule plan processing section 214, a customer task execution processing section 215, a repair task schedule plan processing section 216, a repair task execution processing section 217, and a parts supply/inventory management processing section 218.

The first function is realized by the condition acquisition processing section 211. The second function is realized by the asset deterioration/signal generation/failure rate/failure processing section 212. The third function is realized by the asset deterioration/signal generation/failure rate/failure processing section 212 and the anomaly detection/diagnosis processing section 213. The fourth function is realized by the customer task schedule plan processing section 214 and the repair task schedule plan processing section 216. The fifth function is realized by the customer task schedule plan processing section 214 and the customer task execution processing section 215. The sixth function is realized by the repair task schedule plan processing section 216 and the repair task execution processing section 217. The seventh function is realized by the parts supply/inventory management processing section 218.

Each processing section such as the condition acquisition processing section 211 configuring the O&M service simulator 210 performs each process by referring to information accumulated in each database stored in the storage portion 220.

The condition acquisition processing section 211 registers various conditions which are set by the user by using the condition setting portion 102, in the databases of the storage portion 220.

The asset deterioration/signal generation/failure rate/failure processing section 212 processes detection in an O&M asset due to an operation of the asset and generates a signal in which the detection is reflected. A process of determining a problem or a failure by using a failure rate is performed.

The anomaly detection/diagnosis processing section 213 processes anomaly detection and diagnosis of a system of an O&M asset in a diagnosis service company. In a case where an anomaly is detected, a schedule for predictive maintenance is planned.

The customer task schedule plan processing section 214 plans a schedule for an operation of an O&M asset. The customer task execution processing section 215 processes an operation of the O&M asset according to the planned operation schedule.

The repair task schedule plan processing section 216 plans a schedule for a repair task of a maintenance worker of an O&M asset according to the occurrence of a problem or a failure or anomaly detection. The repair task execution processing section 217 processes execution of maintenance according to the planned schedule for the repair task. The parts supply/inventory management processing section 218 processes parts supply and inventory management in a maintenance business entity or a parts business entity.

The storage portion 220 of the simulation execution unit 20 includes a plurality of databases storing various pieces of information. Specifically, the storage portion 220 stores a business entity/O&M asset definition database (DB) 221, an O&M asset system definition DB 222, a failure/anomaly control limit information DB 223, a deterioration function/signal generation definition DB 224, a failure probability/failure rate definition DB 225, an O&M asset schedule DB 226, a maintenance menu DB 227, a maintenance business entity (worker) schedule DB 228, a customer task DB 229, a repair task DB 230, a parts list DB 231, and a parts inventory DB 232.

Information defining a configuration of a business entity or an O&M asset is registered in the business entity/O&M asset definition DB 221. Information defining a system belonging to an O&M asset is registered in the O&M asset system definition DB 222. Information indicating a control limit for determining a failure or an anomaly of an O&M asset is registered in the failure/anomaly control limit information DB 223.

Information defining a deterioration function indicating the progress of deterioration in an O&M asset and a signal which is output according thereto is registered in the deterioration function/signal generation definition DB 224. A failure probability of an O&M asset set by the user and a failure rate calculated in correspondence therewith are registered in the failure probability/failure rate definition DB 225.

Information indicating an operation plan schedule for an O&M asset is registered in the O&M asset schedule DB 226. Information indicating a specific content of maintenance work for an O&M asset is registered in the maintenance menu DB 227. A maintenance plan schedule of a maintenance worker for an O&M asset is registered in the maintenance business entity (worker) schedule DB 228.

A customer task planned for an O&M asset is registered in the customer task DB 229. A repair task planned for an O&M asset is registered in the repair task DB 230. A list of parts used for repair of an O&M asset is registered in the parts list DB 231. Information indicating a parts inventory situation is registered in the parts inventory DB 232.

<Summary of Process of Obtaining Condition for Maintenance Method Making KPI Best in Maintenance Planning Apparatus>

Figure 3:
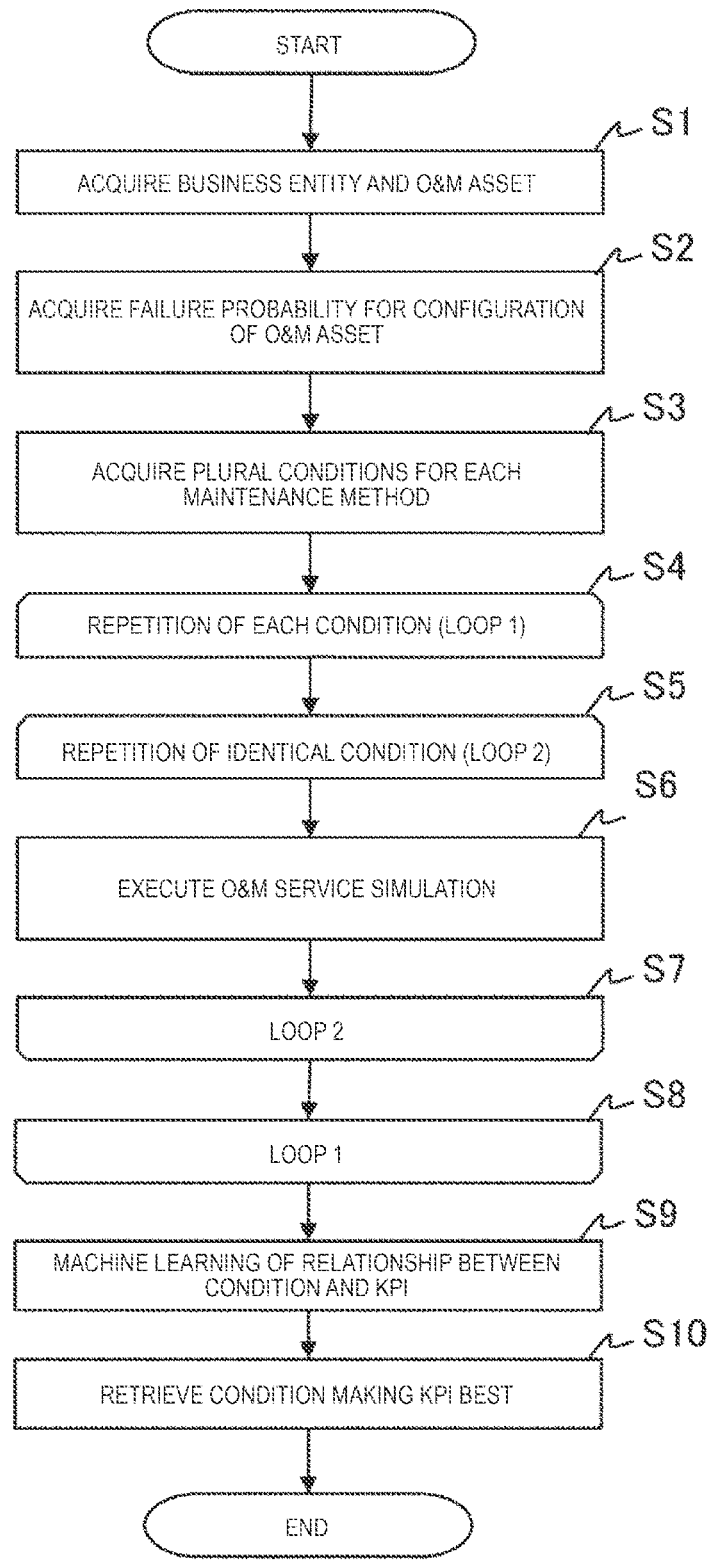
FIG. 3 is a flowchart for explaining an example of a process of obtaining a condition of a maintenance method of making a KPI best by using the maintenance planning apparatus.

Next, FIG. 3 is a flowchart for explaining a summary of a process of obtaining a condition for a maintenance method making a KPI best in the maintenance planning apparatus.

First, the simulation execution unit 20 acquires information regarding a business entity and an O&M asset from the control unit 10 (step S1). Specifically, information indicating a relationship among a customer company, an O&M asset, a maintenance company, a worker, and the like is acquired.

Next, the simulation execution unit 20 acquires a failure probability for any operation time with respect to a configuration of the O&M asset (step S2). The O&M asset is configured with one or more systems in which a problem or a failure may occur, and thus the failure probability is acquired as information for calculating a failure rate for determining the occurrence of a problem or a failure with respect to each system.

Next, the simulation execution unit 20 acquires a plurality of conditions in various maintenance methods from the control unit 10 (step S3). Specifically, for example, a maintenance interval of scheduled maintenance, a control limit in condition-based maintenance, or a threshold value for predictive maintenance is acquired.

Next, the simulation execution unit 20 sequentially employs one of the plurality of conditions in various maintenance methods, acquired in step S3 (step S4), and causes the O&M service simulator 210 to perform simulation a plurality of times under the employed identical condition (steps S5 to S7). The simulation is performed a plurality of items, and then the simulation execution unit 20 returns the process to step S4. All of the plurality of conditions in various methods, acquired in step S3, are sequentially employed, and simulation is repeatedly performed a plurality of times under an identical condition (steps S4 to S8).

Here, a description will be made of a content of simulation executed by the O&M service simulator 210.

A business entity, an O&M asset, and the number of maintenance workers are set in the O&M service simulator 210, configurations of systems are defined in the O&M asset, and control limit information for state monitoring and anomaly detection and a failure rate are set in each system. A content of maintenance for a problem or a failure is set in a maintenance business entity, and a list and an inventory of parts are set in the maintenance business entity and a parts business entity.

In simulation, a process is performed in a time-series repetition. Before the time-series repetition, an operation state of the O&M asset and a schedule for maintenance are set and are initialized. In the time-series repetition, the O&M asset is operated according to the plan. It is determined whether or not a problem or a failure occurs in the O&M asset. In a case where a problem or a failure occurs, predictive maintenance or a repair is planned and is performed for the O&M asset and in the maintenance business entity.

Scheduled maintenance or condition-based maintenance is planned and performed according to settings for the O&M asset and in the maintenance business entity. In a case where parts of the O&M asset are exchanged through maintenance, an inventory of parts is reduced, and, if parts are insufficient, the maintenance business entity orders parts to a warehouse or a manufacturer. The warehouse supplies parts, and orders parts to another warehouse or the manufacturer if parts are insufficient. The manufacturer produces parts if parts are insufficient.

After the simulation target period elapses, and the time-series repetition is finished, the O&M service simulator 210 collects and outputs results such as the number of times of maintenance or an operation rate of the O&M asset as a postprocess. The KPI computation portion 103 computes a KPI such as a profit, an operation rate, or maintenance cost on the basis of the output information. As mentioned above, the content of the simulation performed by the O&M service simulator 210 has been described.

FIG. 3 is referred to again. The O&M service simulator 210 executes the simulation a plurality of times, and then the analysis unit 30 performs machine learning of a relationship between a condition and a KPI (step S9). Since a KPI as a simulation result varies for each execution of simulation, the analysis unit 30 learns a relationship for obtaining a representative value of a KPI for a condition. A KPI varies even for an identical condition, and thus a range of variation is quantified.

Finally, the analysis unit 30 explores a condition making a KPI best (step S10). For example, in a case where importance is put on a profit as a KPI, a condition making the KPI the maximum is explored, and, for example, in a case where importance is put on maintenance cost as a KPI, a condition making the KPI the minimum is explored. In the exploration, evaluation is performed in light of not only a representative KPI value but also the size of variation. As mentioned above, a description has been made of the summary of a process of obtaining a condition of a maintenance method of making a KPI best.

<Summary of O&M Service Simulation>

Next, with reference to FIGS. 4A-4B, a description will be made of summaries of a simulation target and a process.

Figure 4A:
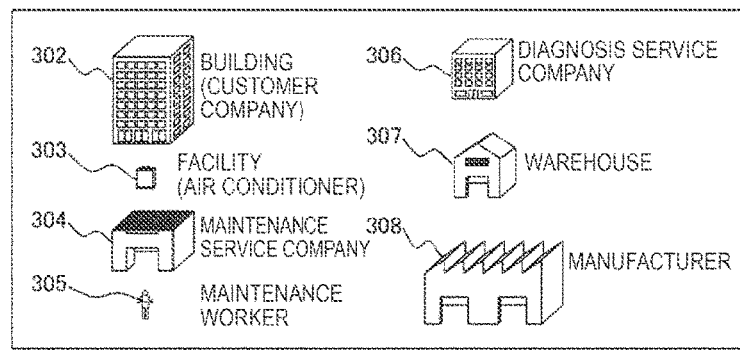
FIGS. 4A-4B are diagrams illustrating an example of a summary of O&M service simulation.

FIG. 4(A) illustrates business entities, an O&M asset, and a person as examples of agents appearing in simulation.

A building (customer company) 302 manages an office building, and operates and manages a facility 303 as an O&M asset provided in the building 302.

The facility 303 is, for example, an air conditioner or an elevator provided in the building 302. For example, the air conditioner is roughly configured with an indoor unit, a piping system, and an outdoor unit, which have different structures and functions, and deterioration thereof progresses in various ways. The facility 303 is not limited to an air conditioner or an elevator, and may be, for example, a home electric appliance, a vehicle, or a production machine or a plant in a factory. The facility 303 may employ a so-called Internet of Things (IoT) technique in which a maintenance service company 304 is notified of a detection signal from a built-in sensor via the Internet.

The maintenance service company 304 employs a maintenance worker 305 who performs maintenance of the facility 303. The maintenance worker 305 stands by in the maintenance service company 304 in a case where maintenance or the like is not performed.

A diagnosis service company 306 is a business entity which monitors the facility 303, and diagnoses the occurrence of anomaly or the like. A warehouse 307 is a parts business entity which distributes parts for maintenance. A manufacturer 308 is a parts business entity which produces parts. In the simulation, business entities, O&M assets, and persons may be set to any number or any place.

Figure 4B:
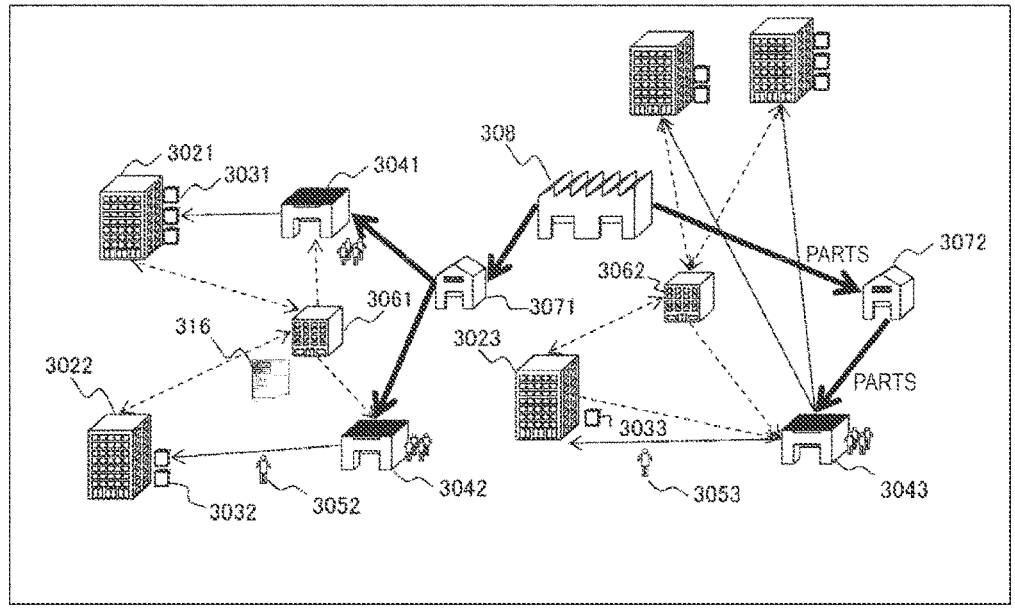

FIG. 4(B) illustrates relationships among simulation target business entities, O&M assets, and persons. In FIG. 4(B), a solid arrow indicates movement of a person or an object, a thick solid arrow indicates movement of parts, and a dashed arrow indicates transmission and reception of information.

Three facilities 3031 are provided in a first building 3021. Maintenance of the facilities 3031 is performed by a maintenance service company 3041. Monitoring of the facilities 3031 is performed by a diagnosis service company 3061.

Two facilities 3032 is provided in a second building 3022. Maintenance of the facilities 3032 is performed by a maintenance service company 3042. Monitoring of the facilities 3032 is performed by the diagnosis service company 3061. In a case where the occurrence of anomaly in the facilities 3032 is detected, the diagnosis service company 3061 notifies the building 3022 of a diagnosis report 316, and also notifies the maintenance service company 3042 in charge of maintenance of the facilities 3032.

The maintenance service company 3042 plans a schedule for maintenance (predictive maintenance) of the facilities 3032 of the building 3022 on the basis of the diagnosis report 316 which is sent via the diagnosis service company 3061. A maintenance worker 3052 of the maintenance service company 3042 performs the predictive maintenance according to the planned schedule. The predictive maintenance of the facilities 3032 is not necessarily planned and performed via the diagnosis service company 3061.

A facility 3033 is provided in a third building 3023. The building 3023 makes a contract with a maintenance service company 3043 for scheduled maintenance. A maintenance worker 3053 of the maintenance service company 3043 performs scheduled maintenance of the facility 3033 of the building 3023 according to a plan of the scheduled maintenance. In a case where the facility 3033 fails, the building 3023 directly requests a repair to the maintenance service company 3043, and the maintenance worker 3053 repairs the facility 3033 in response to the request.

In a case where maintenance is performed, parts are exchanged, and thus an inventory of a part which is a new product for replacement is reduced. The maintenance service company 3043 manages an inventory, and orders parts to a warehouse 3072 if the parts are insufficient. The warehouse 3072 sends the parts to the maintenance service company 3043 in response to the order. The maintenance service company 3043 accepts the sent parts, and manages the parts as a new inventory.

The warehouse 3072 manages an inventory of parts, and orders parts to the manufacturer 308 in a case where the parts are insufficient. The manufacturer 308 produces parts in a case where an inventory of the parts is insufficient. In other words, the manufacturer 308 issues a production order, manufactures parts in a predetermined period, and manages the parts as a new inventory.

In the simulation, as premise thereof, a business entity, an O&M asset and an operation condition thereof, the number of maintenance workers, a failure probability for an operation of the O&M asset, various maintenance methods and condition, and conditions such as parts cost are set. In the simulation, contents are simulated that the O&M asset is operated every day in a time series in tracking of elapse of time, a problem or a failure occurs due to deterioration in the O&M asset, a schedule for various pieces of maintenance is adjusted, and maintenance is performed. After the simulation is finished, profits, operation rates, and costs are collected. As mentioned above, a description has been made of the summary of a simulation target and a process.

<Summaries of Plans and Execution of Various Maintenance Methods>

Next, with reference to FIGS. 5A-5D, a description will be made of summaries of plans and execution of various maintenance methods. As the maintenance methods, four types of methods such as scheduled maintenance illustrated in FIG. 5(A), a repair illustrated in FIG. 5(B), condition-based maintenance illustrated in FIG. 5(C), and predictive maintenance illustrated in FIG. 5(D) are supposed. In each of FIGS. 5(A)-5(D), a horizontal axis expresses time, and indicates that time elapses toward the right.

Figure 5A:
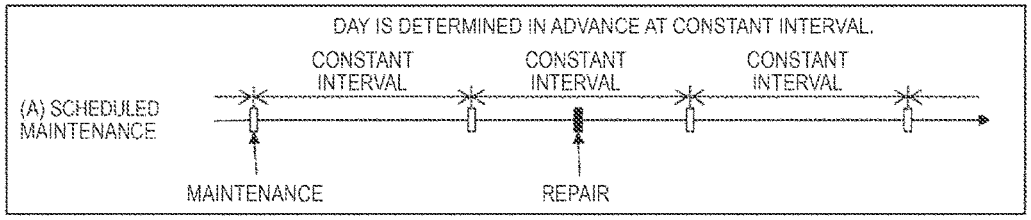
FIGS. 5A-5D are diagrams for explaining four types of maintenance methods.

In the scheduled maintenance, as illustrated in FIG. 5(A), maintenance is periodically performed at a constant interval set in advance. Even in a case where a repair is performed due to a sudden failure, the maintenance interval is maintained.

Figure 5B:
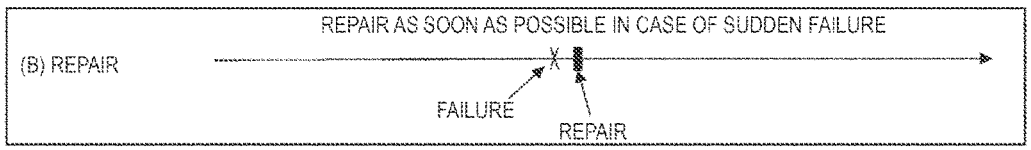

As illustrated in FIG. 5(B), in the repair, in a case where a failure occurs in an O&M asset, a measure to recover the O&M asset is taken as soon as possible. Specifically, in a case where a failure occurs, a repair schedule is planned and executed at the date and time which is as convenient to a maintenance worker as possible on the day or the next day or later.

Figure 5C:
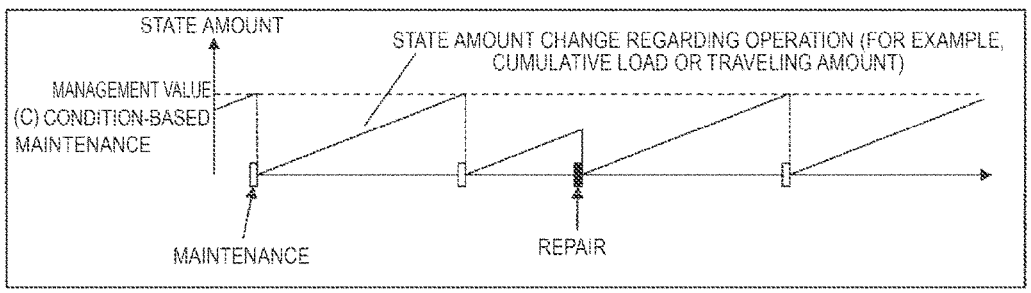
Figure 5D:
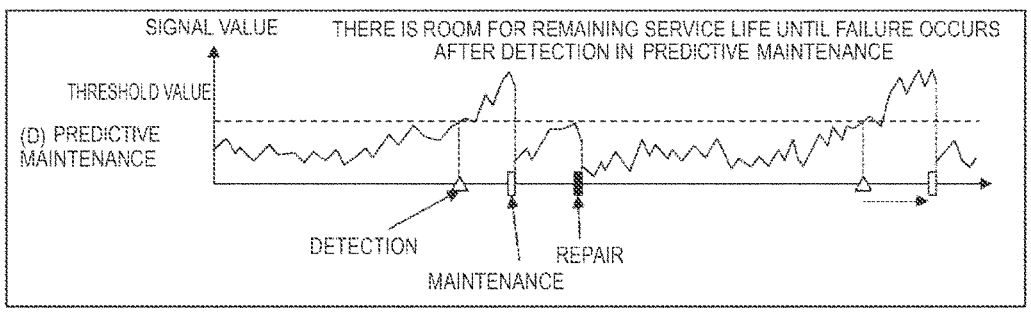

In the condition-based maintenance, as illustrated in FIG. 5(C), maintenance is performed according to a cumulative operation rate of the O&M asset. An operation rate is managed as a state amount. The state amount indicates, for example, a cumulative operation time or a load such as power consumption. In a case where the O&M asset is a vehicle, the state amount indicates a traveling distance. A vertical axis in FIG. 5(C) expresses a state amount, and a control limit for determining the necessity of maintenance is set therein. After maintenance is performed, a state amount change regarding an operation is monitored, and maintenance is planned and is performed at the time at which a state amount reaches a control limit. In a case where a repair is performed due to the occurrence of a failure, the O&M asset is recovered, a state amount is initialized, and a change thereof is monitored from that time.

In predictive maintenance, as illustrated in FIG. 5(D), a signal value output from the O&M asset is monitored, it is detected that the signal value exceeds a threshold value, and maintenance is planned and is performed. A vertical axis in FIG. 5(D) expresses a signal value, and a threshold value is set therein. In the predictive maintenance, a failure is not detected, and thus there is room for execution of maintenance for a period of the remaining service life until a failure occurs after detection. Therefore, a schedule for predictive maintenance may be planned by reflecting circumstances of an O&M asset and a maintenance business entity. In a case where a failure occurs before predictive maintenance is performed, a repair is performed. As mentioned above, a description has been made of summaries of planning and execution of each of various maintenance methods.

<Failure Probability and Failure Rate in Each System of O&M Asset>

Figure 6A:
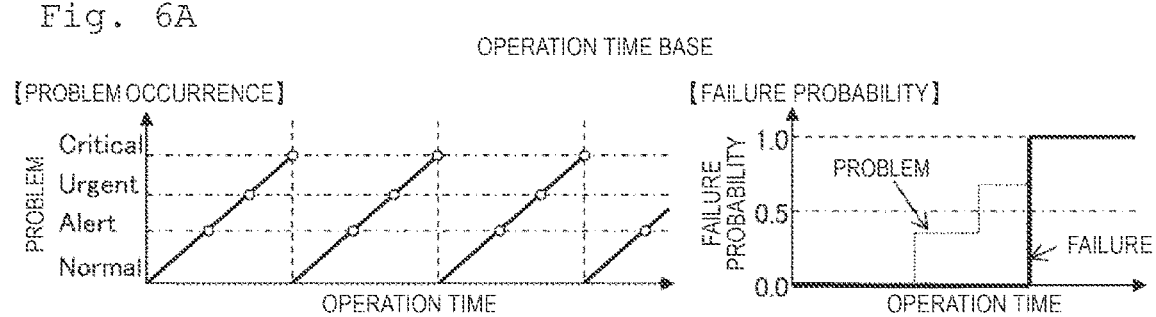
FIGS. 6A-6B are diagrams illustrating examples of relationships of the occurrence of a problem and a failure probability for operation time.
Figure 6B:
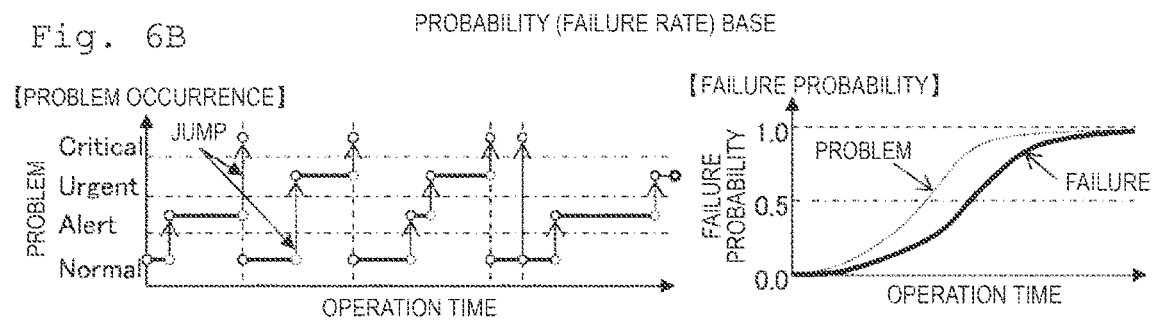

Next, with reference to FIGS. 6A-6B, a description will be made of a failure probability and a failure rate in which a problem or a failure occurs in a probabilistic manner in each system of an O&M asset. FIGS. 6A-6B illustrate a relationship between the occurrence of a problem and a failure probability for operation time.

FIG. 6(A) illustrates a situation of operation time-based problem occurrence in which an O&M asset deteriorates as the O&M asset is operated, and a problem or a failure occurs in proportion to the deterioration. In a problem occurrence graph on the left in FIG. 6(A), a vertical axis expresses the degree of problem, and the degree of problem is higher in an order of normal (no problem), alert (few problems), urgent (many problems), and critical (failure occurrence). In the graph, a problem is expressed as a straight line in which the number of problems gradually increases with respect to an operation time. A problem is removed, and thus the O&M asset is recovered to a normal state, due to a repair performed according to failure occurrence. The problem occurrence graph may be used for explanation of a timing of condition-based maintenance or predictive maintenance. However, in a case of the operation time base, as illustrated on the right in FIG. 6(A), a failure probability is not realistic since a problem (dotted line) occurs at a fixed operation time, and a failure (solid line) necessarily occurs at a fixed operation time.

Next, FIG. 6(B) illustrates problem occurrence and a failure probability based on a probability (failure rate) for an operation time of the O&M asset. As in a problem occurrence graph illustrated on the left in FIG. 6(B), a problem occurs at a certain timing during an operation time, and the degree of problem jumps to alert or urgent from normal. A failure occurs at a certain timing, and the degree of problem jumps to critical. A probability-based model is a model which transitions to a different state in a case where a random number exceeds a predetermined probability value, and thus the occurrence of a problem or a failure appears in the form of "jump". This probability is referred to as a failure rate $\lambda$.

The occurrence of a failure for the failure rate $\lambda$ is determined by using the following Expressions (1) and (2).

$$r = U[0, 1) \tag{1}$$

$$\begin{cases} r < \lambda: \text{failure} \\ r \geq \lambda: \text{no} - \text{failure} \end{cases} \tag{2}$$

In Expression (1), U indicates generation of uniform random numbers, and [a,b) is a symbol indicating a range of a or more and below b. Therefore, U[a,b) indicates generation of uniform random numbers in a range of a or more and below b.

In a case where the unit of the failure rate $\lambda$ is (probability/day), the O&M asset may be operated for 24 hours per day, and the failure rate may be $\lambda/24$ in a case where failure occurrence is determined every hour. In a case where the O&M asset is operated for 12 hours per day, and a failure does not occur during non-operation, the failure rate per hour during an operation may be $\lambda/12$. In other words, the time unit of the failure rate may be converted with respect to a determination time interval.

A failure probability graph of the probability-based model is expressed to be divided into a problem (dotted line) and a failure (solid line) as illustrated on the right in FIG. 6(B). According to the probability-based failure probability graph, it can be seen that, in the O&M asset, if an operation time is long, the number of systems in which a problem or a failure occurs increases, and, even if an operation time is short, a system in which a problem or a failure occurs is present.

The probability base is used to evaluate the occurrence of a problem or a failure in reality compared with the operation time base, and, thus, in the present embodiment, the probability-based problem occurrence and failure probability are employed.

<Problems Expected in Failure Probability and Failure Rate>

Figure 7A:
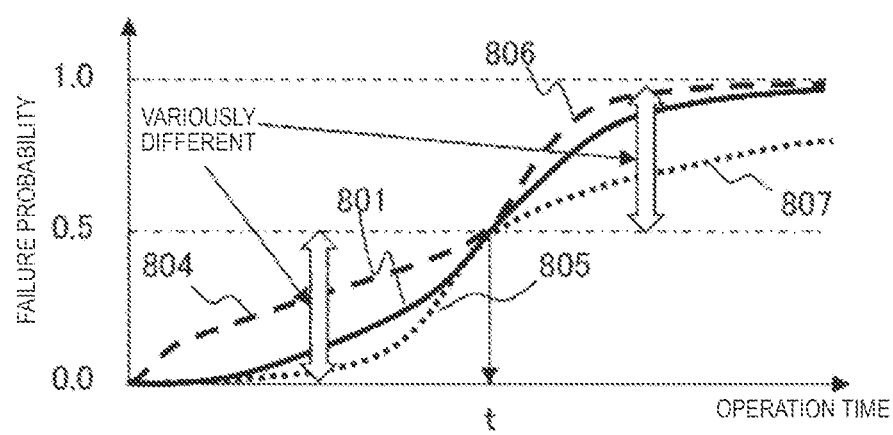
FIGS. 7A-7C are diagrams for explaining problems related to a failure probability and setting of a failure rate.
Figure 7B:
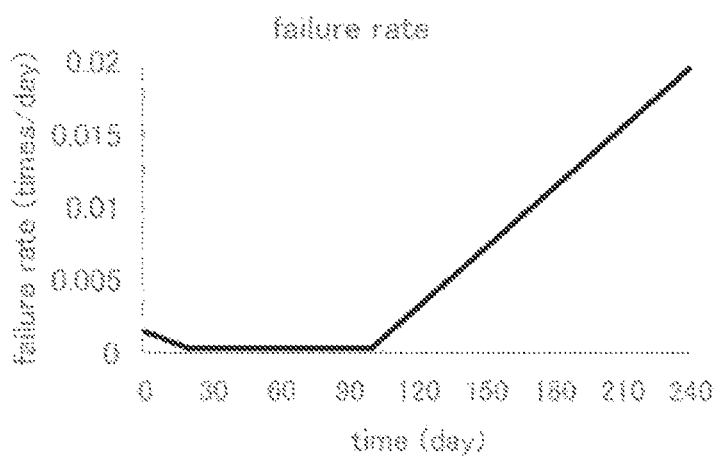
Figure 7C:
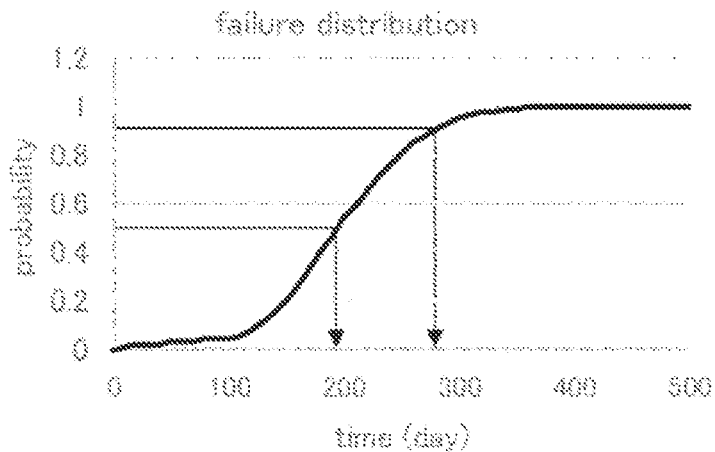

Here, with reference to FIGS. 7A-7C, a description will be made of problems expected in a failure probability and a failure rate. FIGS. 7A-7C are diagrams for explaining problems expected in a failure probability and a failure rate.

FIG. 7(A) illustrates various failure probability distributions. There are various O&M assets and systems thereof, there are individual differences in usage environments or quality even in an identical form, and thus a failure probability is various. The failure probability is a distribution function which monotonously increases in a broad sense and in which a probability value is 0 when time on a horizontal axis is 0, and is 1 at a certain time or an infinite time, and a form thereof is not limited as long as such a condition is satisfied.

A failure probability distribution 801 indicated by a solid line in FIG. 7(A) has an operation time t at a representative probability value of 0.5. Even if the operation time t is fixed at the probability value of 0.5, there may be various failure probability distributions in which failure probabilities are different from each other before and after the operation time t. For example, there may be a failure probability distribution 804 in which a failure probability before the operation time t is higher than that of the failure probability distribution 801, or, for example, a failure probability distribution 807 in which a failure probability after the operation time t is lower than that of the failure probability distribution 801.

FIGS. 7(B) and 7(C) are diagrams for explaining a difference between a failure rate and a failure probability. The failure probability is also referred to as a time-to-failure probability. As described above, in a case where of the probability base, the occurrence of a problem or a failure is shown in a case where a random number exceeds a failure rate, and thus the failure rate is necessarily set in probability-based simulation.

The failure rate is the number of failures at a predetermined time interval at a certain time point. For example, the failure rate is a probability that a failure occurs once a year at a time point of half a year of an operation, and, in this case, a unit system is the number/year. A graph of the failure rate in FIG. 7(B) has a horizontal axis expressing time, and a vertical axis expressing a failure rate (times/day). Since a value of the failure rate is small, and does not directly correspond to the number of failures, it is hard to set a numerical value thereof.

On the other hand, a graph of a failure probability distribution (failure distribution) illustrated in FIG. 7(C) has a horizontal axis expressing time (day) and a vertical axis expressing a probability. In the graph of the failure probability distribution, it can be easily seen that a failure probability starts to increase to 0.1 for 100 days, and increases to 0.5 below 200 days, that is, failures occur in 50% of a total number of O&M assets, and failures occur in up to 90% of the O&M assets for 280 days. Therefore, it can be said that the graph of the failure probability distribution is more easily understood than the graph of the failure rate.

Since a theoretical relationship in reliability engineering is established between the failure probability and the failure rate, in the present embodiment, the failure rate calculation portion 104 of the control unit 10 calculates a failure rate on the basis of a set failure probability such that a user can easily understand the failure probability. Various distributions may be set for a failure probability, and a failure rate calculated on the basis thereof has various distributions. Thus, a piecewise linear failure rate model is defined in which a failure rate is divided into short time segments, and a failure rate change is indicated by a line segment in each segment.

<Piecewise Linear Failure Rate Model>

Next, FIGS. 8A-8D are diagrams for explaining a piecewise linear failure rate model.

Figure 8A:
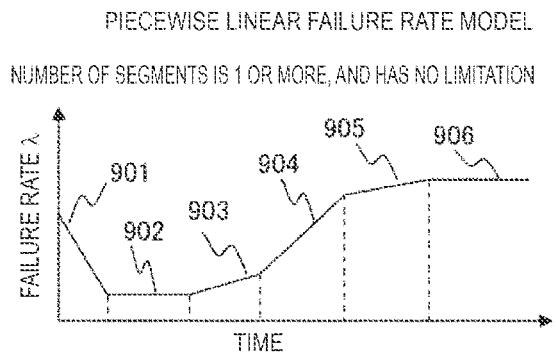
FIGS. 8A-8D are diagrams for explaining definition of a piecewise linear failure rate model.

FIG. 8(A) is a graph illustrating an example of a piecewise linear failure rate model. A horizontal axis of the graph expresses time, and a vertical axis thereof expresses a failure rate. A range of the time is divided into any number of segments, and a failure rate change is defined by a straight-line segment within a segment. In a case of FIG. 8(A), there are six segments such as segments 901 to 906. The segment 901 starts from the time point of 0. The last segment 906 is a range up to infinite. In each segment, a failure rate is defined by a range of time t and a straight line.

Figure 8B:
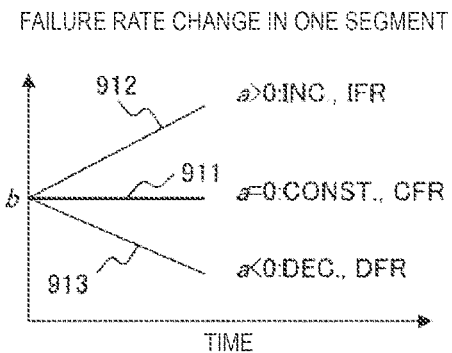

FIG. 8(B) illustrates an example of a failure rate change indicated by a straight line in each segment. A straight line in each segment may be expressed by the following Equation (3).

$$\lambda = at + b \quad (3)$$

A value of the intercept b in Equation (3) may be set such that the failure rate $\lambda$ is in the range of [0,1) (0 or more and less than 1) as can be seen from the relationship of Expressions (1) and (2). A straight-line segment 911 illustrated in FIG. 8(B) indicates a case where the coefficient a is 0, and is referred to as a constant failure rate. A straight-line segment 912 indicates a case where the coefficient a has a positive value, and is referred to as an increasing failure rate. A straight-line segment 913 indicates a case where the coefficient a has a negative value, and is referred to as a decreasing failure rate.

Figure 8C:
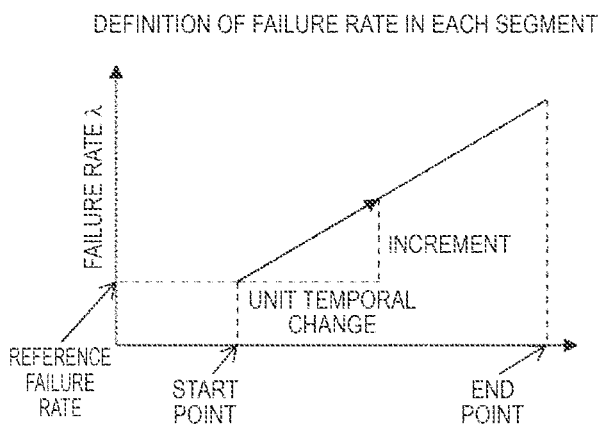

FIG. 8(C) illustrates an example of definition of a failure rate of each segment. If an increment for a temporal change of the unit amount of 1 is given at a reference failure rate and a start point, a straight-line segment up to an end point is obtained.

Figure 8D:
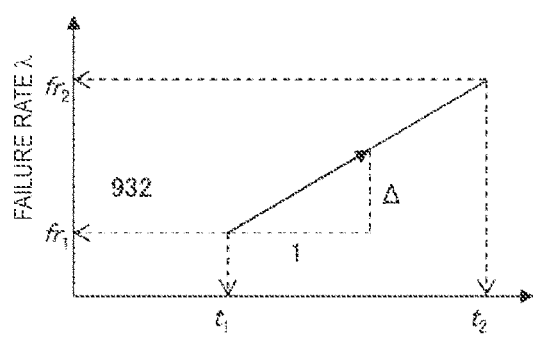

FIG. 8(D) illustrates an example of setting an increment. If a failure rate $fr_1$ at a start point $t_1$ and a failure rate $fr_2$ at an endpoint $t_2$ are given, an increment $\Delta$ may be obtained through computation of $\Delta = (fr_1 - fr_2)/(t_1 - t_2)$.

As described above with reference to FIG. 6, in a case where the occurrence of a problem or a failure corresponds to four extents of problem such as normal, alert, urgent, and critical, the piecewise linear failure rate model used as a judgment criterion is in need of three determinations such as an alert determination, an urgent determination, and acritical determination.

Figure 9:
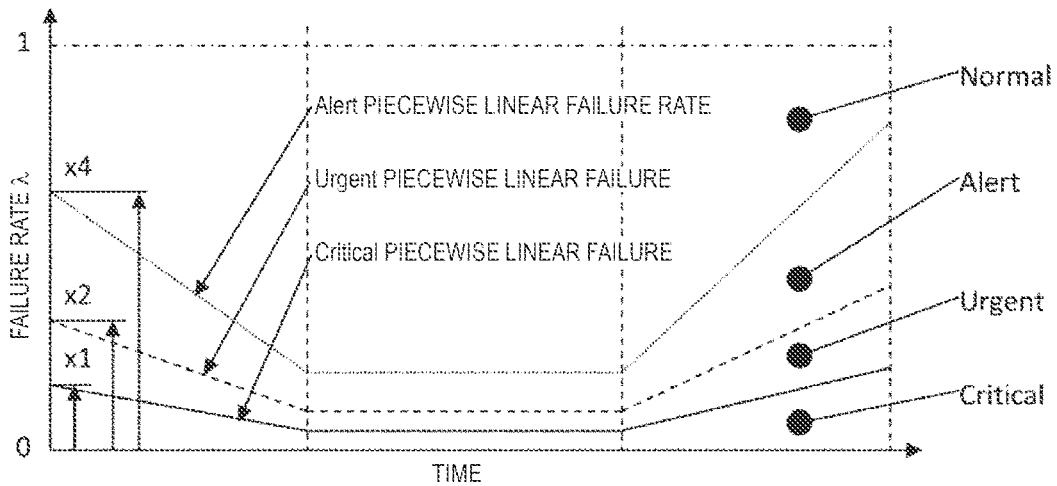
FIG. 9 is a diagram illustrating an example of the piecewise linear failure rate model for determining each of a problem and a failure.

FIG. 9 illustrates an example of a piecewise linear failure rate model for the alert determination, the urgent determination, and the critical determination. A distribution of the piecewise linear failure rate model in FIG. 9 is shaped like a bathtub curve.

Generally, an O&M asset is considered to reach a failure after a problem occurs, and thus a problem is assumed to more easily occur than a failure. In a case where a critical piecewise linear failure rate is set as a reference, that is, one time (X1), an urgent piecewise linear failure rate may be set to be two times (X2), and an alert piecewise linear failure rate may be set to be four times (X4).

In the piecewise linear failure rate model, critical may be determined in a range of the failure rate $\lambda$ from 0 to the critical piecewise linear failure rate. Urgent may be determined in a range of the failure rate $\lambda$ from the critical piecewise linear failure rate to the urgent piecewise linear failure rate. Alert may be determined in a range of the failure rate $\lambda$ from the urgent piecewise linear failure rate to the alert piecewise linear failure rate. Normal may be determined in a range of the failure rate $\lambda$ from the alert piecewise linear failure rate to 1.

In the above description, piecewise linear failure rate models for the respective determinations are set to be integer multiples of the critical piecewise linear failure rate, but the respective failure rates may be set to be parallel to each other by adding predetermined differences to the critical piecewise linear failure rate. The piecewise linear failure rate models for the respective determinations may be set separately from each other.

<Method of Obtaining Piecewise Linear Failure Rate Model on the Basis of Failure Probability>

A failure rate is necessary in order to determine failure occurrence, but it is hard to set a judgment criterion in the failure rate. On the other hand, it is easy to set a judgment criterion for determining failure in a failure probability. There is a theoretical relationship in reliability engineering between the failure probability and the failure rate. Therefore, a description will be made of a method of obtaining a piecewise linear failure rate by setting a failure probability.

First, a description will be made of a theory regarding a failure rate in reliability engineering. Reliability $R(t)$, a failure probability (failure distribution) $F(t)$, and a failure density $f(t)$ are defined by the following Expressions (4) to (6).

$$R(t) = Pr\{T > t\} \quad (4)$$

$$F(t) = Pr\{T \leq t\} = 1 - R(t) \quad (5)$$

$$f(t) = \frac{dF(t)}{dt} = -\frac{dR(t)}{dt} \quad (6)$$

Here, Pr is a function for obtaining a value of a range in distribution function, and may be expressed as in the following Equation (7).

$$Pr(a < T \leq b) = \int_a^b f(x) dx \quad (7)$$

The failure rate $\lambda$ is a probability that a failure may occur with respect to a time range at a certain time point t, and may be expressed as in the following Equation (8).

$$\begin{aligned}\lambda(t) &= \lim_{\Delta t \to 0} \frac{-[R(t + \Delta t) - R(t)]}{\Delta t} \frac{1}{R(t)} \\ &= -\frac{dR(t)}{dt} \frac{1}{R(t)} \\ &= \frac{f(t)}{R(t)}\end{aligned} \quad (8)$$

A relationship between reliability and a failure rate is understood from Equation (8). In a case where a function of the failure rate is defined, the reliability $R(t)$ may be determined according to the following Equation (9).

$$\begin{aligned}R(t) &= \exp\left[-\int_0^t \lambda(x)dx\right] \\ &= \exp\left[-\int_0^t (at+b)dt\right] = \exp = \left[-\frac{1}{2}at^2 - bt + c\right]\end{aligned} \quad (9)$$

A failure probability may be determined from Equation (5).

Figure 10A:
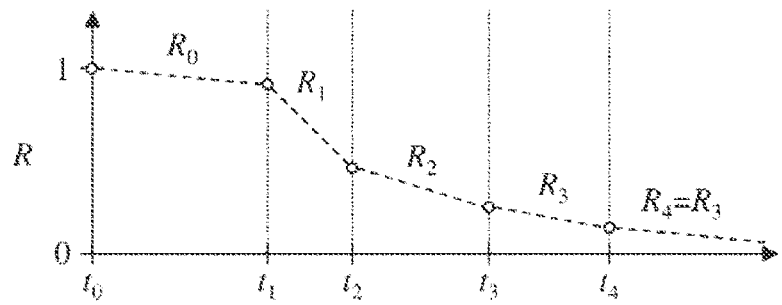
FIGS. 10A-10D are diagrams illustrating examples of relationships of reliability, a failure probability, a failure density, and a failure rate based on the piecewise linear failure rate model.
Figure 10B:
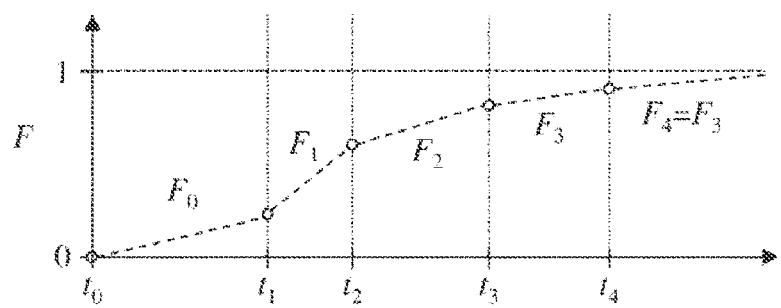
Figure 10C:
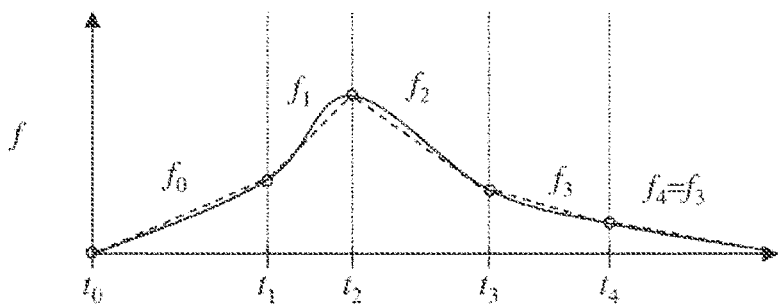
Figure 10D:
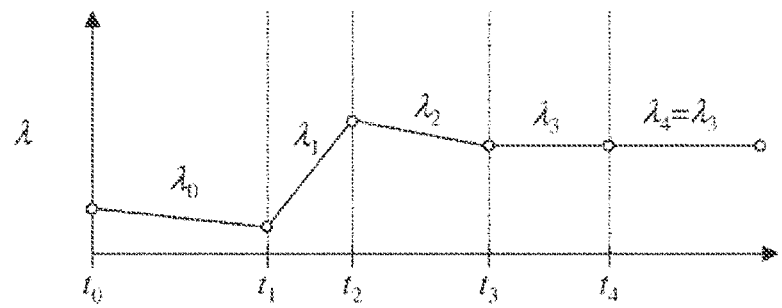

FIGS. 10A-10D illustrate an example of a relationship among reliability (FIG. 10(A)), a failure probability (FIG. 10(B)), a failure density (FIG. 10(C)), and a failure rate (FIG. 10(D)) based on a piecewise linear failure rate model. With respect to the reliability (FIG. 10(A)) and the failure probability (FIG. 10(B)), only graphs are illustrated in which pieces of data at time points are connected to each other via dashed straight-line segments. With respect to the failure density (FIG. 10(C)), a graph in which a curve indicated by a solid line appears is illustrated. A curve of the reliability may be obtained from Equation (9), and a curve of the failure probability may be obtained from Equation (5). A section number is indicated by an index starting from 0, and an index of a segment matches an index at a start point. In a case where an index of last segment is indicated by n, a total number of segments is n+1. A failure probability is set for data up to the index n, and thus reliability, a failure probability, a failure density, and a failure rate in the last segment n are set to have the same values as those in the previous segment n−1.

In the segment i, the failure rate $\lambda(t)$ is expressed by the following Equation (10).

$$\lambda_i(t) = a_i t + b_i \quad (10)$$

However, the failure rate $\lambda(t)$ is required to have a value of 0 or more. In a case where the relationship of Equation (9) is used, in the segment i, the reliability $R(t)$ is expressed by the following Equation (11).

$$R_i(t) = \exp\left[-\frac{a_i}{2}t^2 - b_i t + c_i\right] \quad (11)$$

The failure probability $F(t)$ and the failure density $f(t)$ may be obtained from the above-described relationship so as to be set.

A piecewise linear failure rate model is obtained on the basis of the set failure probability $F(t)$. Data regarding the piecewise linear failure rate model is given by a failure rate $F_i$ for a time point $t_i$.

Next, a description will be made of a method of obtaining parameters $a_i$ and $b_i$ of the piecewise linear failure rate model and $c_i$ shown in Equation (11) in a case of the reliability $R_i = 1 - F_i$.

The parameters of the piecewise linear failure rate model are sequentially obtained from the segment 0, and from the segment 1 to the segment n.

A method of obtaining parameters in the segment 0 is as follows. In the segment 0, data regarding reliability is the following two points.

$$\begin{cases}(t_0, R_0(t_0)) \\ (t_1, R_0(t_1))\end{cases} \quad (12)$$

The failure probability $F_0$ at the start point $t_0=0$ is 0, that is, the reliability $R_0$ is 1. From Equation (11), $1=\exp(c_0)$, and thus $c_0$ is 0.

In a case where logarithm is taken for both sides of Equation (11), and the segment 0 is handled as a constant failure rate, the parameters may be obtained as in the following Equation (13).

$$\begin{cases}a_0 = 0 \\ b_0 = -\frac{\ln R_0(t_1)}{t_1} \\ c_0 = 0\end{cases} \quad (13)$$

The failure rate $\lambda$ at the start point to may be set, and the parameters may be obtained. Particularly, the occurrence of an initial failure may be based on a decreasing failure rate DFR. In other words, a relationship of $a_0 < 0$ may be established, and thus there may be a case where the failure rate $\lambda$ is 0. This time point may be set to $t0^*$, and parameters in a section $[t_0, t_0^*)$ and a section $[t_0^*, t_1)$ may be respectively obtained.

This indicates that the section $[t_0,t_1)$ of the segment 0 is divided into the section $[t_0,t_0^*)$ and the section $[t_0^*,t_1)$. Therefore, 1 is added to index values after the original segment 1, and the section $[t_0^*,t_1)$ is set as a new segment 1. Parameters in the new segment 1 are obtained as in the following Equation (14).

$$\begin{cases} a_1 = 0 \\ b_1 = 0 \\ c_1 = 0 \end{cases} \quad (14)$$

Next, a description will be made of a method of obtaining parameters in the intermediate segment i. Reliability data of the segment is given by the following Expression (15).

$$\begin{cases} (t_i, R_i(t_i)) \\ (t_{i+1}, R_i(t_{i+1})) \end{cases} \quad (15)$$

Simultaneous equations of the following Equation (16) may be obtained on the basis of logarithmic conversion shown in Equation (11).

$$\begin{cases} \ln R_i(t_i) = -\frac{a_i}{2}t_i^2 - b_i t_i + c_i \\ \ln R_i(t_{i+1}) = -\frac{a_i}{2}t_{i+1}^2 - b_i t_{i+1} + c_i \end{cases} \quad (16)$$

As illustrated in FIG. 10(D), regarding the failure rate, connection at the time point $t_i$ between the segment i−1 and the segment i leads to the following Equation (17).

$$a_{i-1}t_i + b_{i-11} = a_i t_i + b_i \quad (17)$$

Since the parameters of the piecewise linear failure rate model are sequentially obtained from a segment with a smaller index, $a_{i-1}$ and $b_{i-1}$ in Equation (17) are obtained, and thus values of the left side are already obtained. Therefore, simultaneous equations regarding the parameters $a_i$, $b_i$, and $c_i$ may be obtained on the basis of Equations (16) and (17).

If Equations (16) and (17) are expressed as in the following Equation (18) by using vectors $V_f$ and $V_a$, and a matrix $M_F$, the parameters may be obtained according to the following Equation (19).

$$V_f = M_F V_a \quad (18)$$

$$[a_i b_i c_i]^T = V_a = M_F^{-1} V_f \quad (19)$$

The presence of the parameters is clearly shown on the left side of Equation (19), and the upper right suffix T of the vector indicates transposition. A determinant of the matrix $M_F$ is not 0, and thus there is necessarily an inverse matrix thereof.

In a case where there is no change in reliability as in $R_i(t_i) = R_i(t_{i+1})$, the failure rate $\lambda$ in a segment thereof is 0. Therefore, since $a_i = b_i = 0$, and $R_{i-1}(t_i) = R_i(t_i)$, the parameters may be obtained according to the following Equation (20).

$$\begin{cases} a_i = 0 \\ b_i = 0 \\ c_i = -\frac{a_{i-1}}{2}t_i^2 - b_{i-1}t_i + c_{i-1} \end{cases} \quad (20)$$

In a case where a failure rate is desired to be set to a constant failure rate, $a_i$ may be set to 0. Then, the simultaneous equations of Equation (16) may be solved.

In this case, an inverse matrix is necessarily obtained, and thus $b_0$ and $c_0$ may also be obtained. As mentioned above, a description has been made of a method of obtaining parameters in the intermediate segment i.

Next, a description will be made of a method of obtaining parameters in the terminal segment n. The terminal segment n has the same parameters as those in the segment n−1. In other words, the parameters are as in the following Equation (21).

$$\begin{cases} a_n = a_{n-1} \\ b_n = b_{n-1} \\ c_n = c_{n-1} \end{cases} \quad (21)$$

However, it is necessary to set $a_n$, $b_n$, and $c_n$ such that a failure probability is necessarily 1 up to infinite time. The above description relates to a method of obtaining parameters in the terminal segment n.

<Setting of Failure Probability>

Next, a description will be made of a method of setting a failure probability. A failure probability may be set to a start point of each segment, for example, values such as 0.0, 0.1, 0.2, 0.5, and 0.9 may be respectively set for 0-th day, 50-th day, 100-th day, 180-th day, and 210-th day. An initial value of a failure rate may be set for 0-th day of operation time by using an FR0 command. A constant failure rate may be set to any segment by using a CFR command.

<Display Example of Failure Probability Setting Screen>

Next, FIG. 11 illustrates a first display example of a failure probability setting screen used for a user to set a failure probability.

A failure probability setting screen 1301 is displayed on the display by the display control unit 40 on the basis of an instruction from the condition setting portion 102. The user may set a failure probability by performing table entry on the failure probability setting screen 1301.

The failure probability setting screen 1301 is provided with a table setting field 1302 and an operation field 1306.

The user may set a failure probability by entering a numerical value or a command in the table setting field 1302. Specifically, in a case of FIG. 11, for example, values such as 0.0, 0.1, 0.5, 0.75, and 0.99 are respectively set for 0 days, 90 days, 120 days, 150 days, and 250 days. 0.01 is set for 0 days as a parameter indicating an initial value of a failure rate by using the FR0 command. Constant failure rates are designated for segments of 90 to 120 days and 250 days to the infinite by using the CFR command.

The table setting field 1302 is provided with an add button 1303 and a delete button 1304. The user may press the add button 1303 so as to add the number of day and thus to increase the number of segments. The user may select a checkbox 1305 and then press the delete button 1304 so as to delete a row and thus to reduce the number of segments.

A failure probability is an increase function in a broad sense, and thus the user may be prompted to enter the failure probability again in a case where entry is not appropriate through judgment whether or not the failure probability increases.

The operation field 1306 is provided with a setting check button 1307, a cancel button 1308, and an OK button 1309. In a case where the setting check button 1307 is pressed, a graph of a piecewise linear failure rate model which is computed on the basis of entry on the table setting field 1302 is displayed. In a case where the cancel button 1308 is pressed, entry on the table setting field 1302 is invalidated, and the failure probability setting screen 1301 is closed. In a case where the OK button 1309 is pressed, a failure probability is set according to entry on the table setting field 1302.

In a case where the setting check button 1307 is pressed, a graph of a failure probability corresponding to entry on the table setting field 1302 may be displayed.

Figure 12:
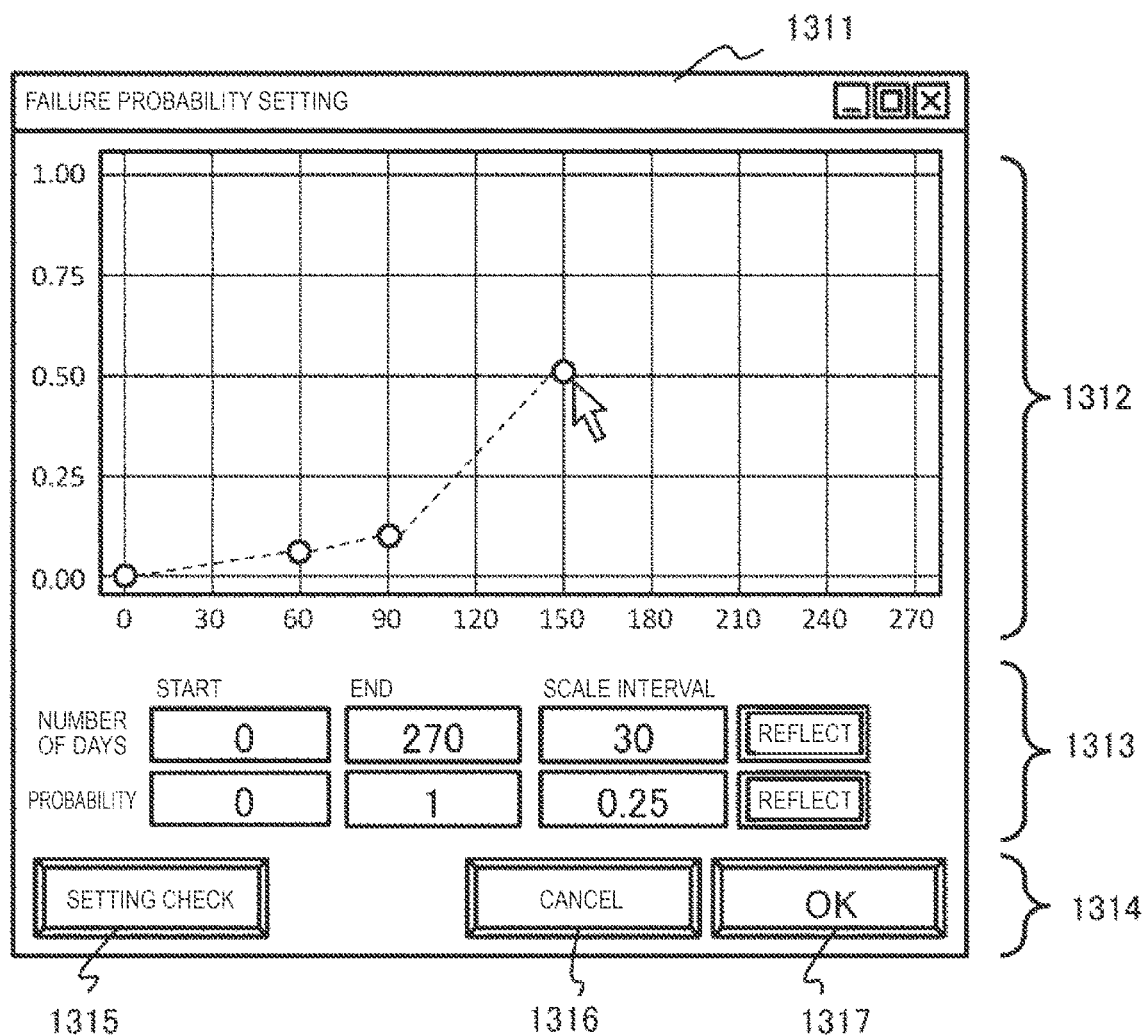
FIG. 12 is a diagram illustrating a second display example of a failure probability setting screen.

Next, FIG. 12 illustrates a second display example of a failure probability setting screen used for a user to set a failure probability.

A failure probability setting screen 1311 is displayed on the display by the display control unit 40 on the basis of an instruction from the condition setting portion 102. The user may set a failure probability by drawing a graph on the failure probability setting screen 1311.

The failure probability setting screen 1311 is provided with a drawing setting field 1312, a scale adjustment field 1313, and an operation field 1314.

In the drawing setting field 1312, the user may draw a graph of a failure probability by generating a point by left-clicking on an operation device such as a mouse, and moving the point with a shift button and through drag and drop operations. The user may perform a menu display operation such as option setting or deletion by right-clicking on the mouse.

In the scale adjustment field 1313, scales on graph axes displayed in the drawing setting field 1312 may be adjusted.

The operation field 1314 is provided with a setting check button 1315, a cancel button 1316, and an OK button 1317. In a case where the setting check button 1315 is pressed, a graph of a piecewise linear failure rate model which is computed on the basis of entry on the drawing setting field 1312 is displayed. In a case where the cancel button 1316 is pressed, entry on the drawing setting field 1312 is invalidated, and the failure probability setting screen 1311 is closed. In a case where the OK button 1317 is pressed, a failure probability is set according to entry on the drawing setting field 1312.

<Piecewise Weibull Failure Rate Model>

In the above description, a piecewise linear failure rate is employed in an O&M asset, but a piecewise Weibull failure rate using a Weibull distribution indicating a deterioration phenomenon with the passage of time may be employed instead of the piecewise linear failure rate. A piecewise Weibull failure rate using a Weibull type cumulative hazard method of estimating a straight line of a failure rate from failure time data may be employed.

Specifically, a failure probability for operation times at two points (a start point and an end point) in each segment is set, and is interpolated between the two points according to a Weibull distribution. A failure probability based on the Weibull distribution monotonously increases in a broad sense, and thus the failure probability is 1 when time is infinite. Therefore, even if a failure probability is divided into segments, a failure probability may be defined in a time domain after the time of 0. Therefore, a piecewise Weibull failure rate model may be defined by profiling a piecewise linear failure rate model.

In a case where the piecewise Weibull failure rate model is employed, a user may set a failure probability for operation times at two points (a start point and an end point) in each segment, and thus it is possible to reduce the number of parameters required to be set by the user compared with the piecewise linear failure rate model.

<Method of Obtaining Condition of Maintenance Method of Making KPI Best>

Next, a description will be made of a method of obtaining a condition of a maintenance method of making a KPI best.

In O&M service simulation, a business entity, an O&M asset, and a maintenance worker are set, configurations of systems are defined in the O&M asset, and control limit information for anomaly detection and a failure rate are set in each system. An operation time or an operation plan is set in the O&M asset. A content of maintenance, a list, and an inventory of parts are set.

As the maintenance methods, four types of methods such as scheduled maintenance, a repair, condition-based maintenance, and predictive maintenance are planned. For example, in the scheduled maintenance, an execution cycle is set as a condition. In the condition-based maintenance, a control limits are set as a condition. In the predictive maintenance, a threshold value is set.

Various conditions are set, and a result such as the number of times of execution of maintenance or an operation rate of the O&M asset is collected as a result of the O&M service simulation. A KPI indicating a business record of the business entity is computed on the basis of the result.

FIGS. 13A-13B illustrate a summary of a method of obtaining an optimal condition making a KPI best. Hereinafter, obtaining an optimal condition making a KPI best will be referred to as an optimal condition exploration.

FIG. 13(A) illustrates a summary of a method of obtaining a relationship between a simulation condition and a KPI for an optimal condition exploration. Conditions include a cycle of scheduled maintenance, a failure rate, a worker (the number thereof), an operation time of an O&M asset, and the like. The KPI is, for example, a profit, cost, an operation rate, a confusion matrix, or a production (of parts). Here, the confusion matrix is a matrix expressing a ratio of the presence or absence of a problem or a failure to whether or not anomaly is detected, and is an index for anomaly detection capability.

In the optimal condition exploration, a relationship between a condition and a KPI is required to be modeled. It is hard to mathematically obtain a relationship between a condition and a KPI (by applying algebraic transformation or a combinatorial optimization theory) as long as a content of O&M service business is not simplified.

Therefore, simulation is executed under various conditions, a KPI is calculated on the basis of results thereof, a machine learning technique is applied in terms of data, and a relationship between a condition and a KPI is modeled. Since a failure rate is set for each system of an O&M asset, and a problem or a failure is caused to occur in a probabilistic manner, even if simulation is executed under an identical condition, results thereof are different from each other. Therefore, a plurality of conditions are set, simulation is executed a plurality of times under each condition such that a plurality of KPIs are calculated, and machine learning is performed by using, as data, a combination of a condition as input and a KPI as output.

The machine learning indicates obtaining parameters of a mathematical model defining a relationship of output (KPI) for input (condition), and a learning performance index or statistics for data. A model correlating input (condition) with output (KPI) may be obtained as a result of the machine learning. Hereinafter, the model will be referred to as a condition-KPI relationship model.

FIG. 13(B) is a diagram for explaining a summary of what can be done with a condition-KPI relationship model, and illustrates a condition-KPI relationship model by using a graph in which a single condition is set in a horizontal axis, and a single KPI is set in a vertical axis, for simplification.

A single KPI may be determined for a condition according to the condition-KPI relationship model indicated by a thick solid line. There is a variation in the condition-KPI relationship model, and the variation indicates a range in which a KPI varies for a condition. According to the condition-KPI relationship model, a KPI can be predicated, and thus a value of the best KPI can be obtained. On the other hand, a condition may be explored from a KPI through optimization. Therefore, a condition for the best KPI may be adjusted through optimization. In a case where the condition-KPI relationship model is a quadratic function which is a downward convex, a condition in which a KPI is the minimum value may be simply computed.

Figure 14A:
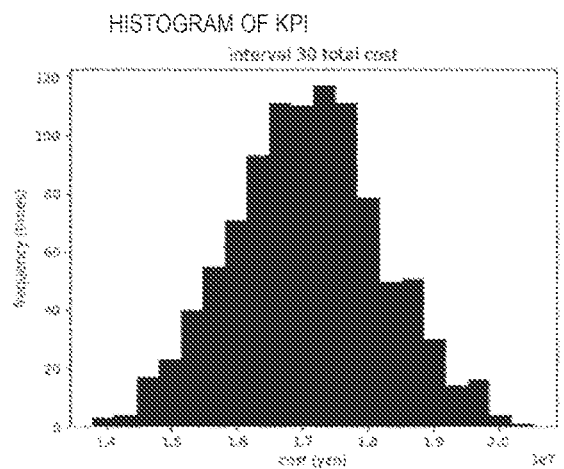
FIGS. 14A-14C are diagrams illustrating an example of a distribution of a KPI for a condition.
Figure 14B:
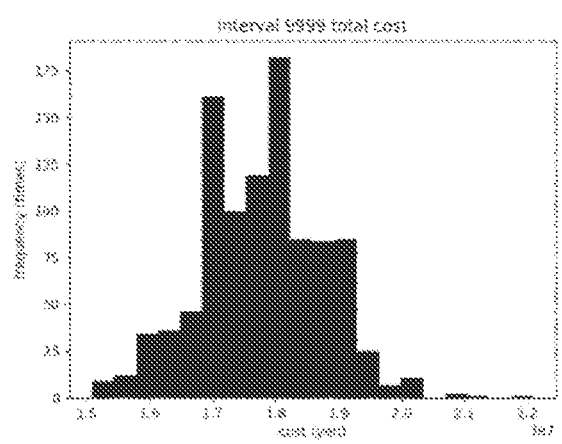
Figure 14C:
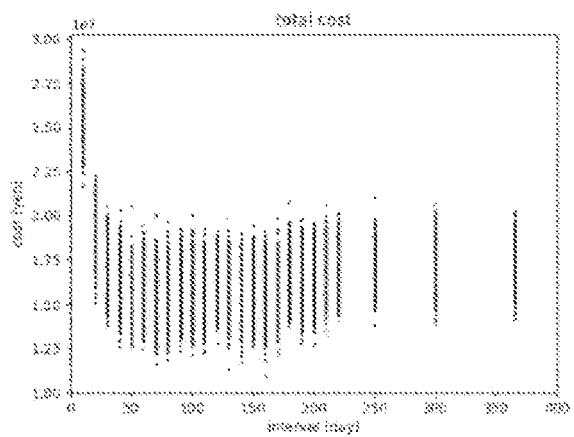

Next, FIGS. 14A-14CB illustrate an example of a distribution (variation) of a plurality of KPIs based on results of simulation executed a plurality of times under an identical condition.

FIG. 14(A) is a histogram (frequency distribution) of a plurality of KPIs based on results of simulation executed a plurality of times with 30 days as a scheduled interval (cycle) of scheduled maintenance. FIG. 14(B) is a histogram (frequency distribution) of a plurality of KPIs based on results of simulation executed a plurality of times without performing scheduled maintenance (or with a very long period as a scheduled interval (cycle) of scheduled maintenance). A horizontal axis in each of FIGS. 14(A) and 14(B) expresses cost required for maintenance.

In a case where both of the histograms are compared with each other, the histogram (FIG. 14(A)) has a bottom wide to the right side (the side on which cost is high) on which scheduled maintenance is performed, but the histogram (FIG. 14(B)) has a bottom wide to the left side (the side on which cost is low) on which scheduled maintenance is not performed, and has two frequency peaks.

FIG. 14(C) illustrates a scatter diagram of a KPI for a condition, in which a condition (a scheduled interval (cycle) of scheduled maintenance) is set in a horizontal axis, and a KPI (cost required for maintenance) is set in a vertical axis. According to FIG. 14(C), it can be seen that the magnitudes of variations of KPIs at the respective conditions are different from each other. It can also be seen that, with respect to the number of days of a scheduled interval, cost decreases from the 0-th day, and cost slightly increases after about the 160-th day.

As mentioned above, it is necessary to first define the best KPI in order to determine an optimal condition in a situation in which there is a change in a KPI for a condition, and there is also a variation.

As in the condition-KPI relationship model indicated by the thick solid line in FIG. 13(B), in a case where a change in a KPI for a condition is determined, a condition making a KPI the minimum (best) may be explored. However, there is a variation in a KPI, and, in a case where the variation is great, there is an increasing risk of an unstable KPI. Conversely, in a case where a variation is small, a KPI is stable. Therefore, it is considered that a condition making a variation in a KPI small is better than a condition making a variation in a KPI great.

Figure 15:
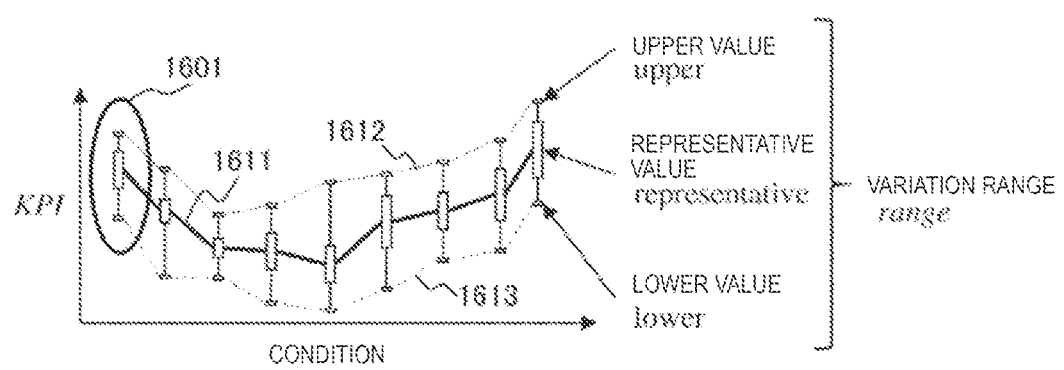
FIG. 15 is a diagram for explaining an approach to KPI evaluation for an optimal condition exploration.

With reference to FIG. 15, a description will be made of an approach to KPI evaluation for an optimal condition exploration in a case where there are a change and a variation in a KPI for a condition. FIG. 15 illustrates a box plot 1601 illustrating an example of a distribution of KPIs for a certain condition.

A change in a KPI for a condition is indicated by a line 1611 which connects representative values which are values of representative KPIs in respective conditions to each other among the conditions. Regarding a representative value, the centers of boxes in the box plots are connected to each other via the line, and thus the representative value indicates a median value (cumulative probability of 0.5). However, a representative value may be a mean value or a most frequent value. A representative value may be any mathematical model such as a polynomial, giving an expression of a condition-KPI relationship model.

On the other hand, in order to express a variation in a KPI, an upper value and a lower value in a distribution are defined. A change of the upper value for a condition is indicated by a line 1612, and a change of the lower value for a condition is indicated by a line 1613. A difference between the upper value and the lower value is used as a variation range. The variation range changes for a condition.

A representative value $KPI^{representative}$ changes for a condition x, and a variation range range is a function which also changes for the condition x. Therefore, the representative value $KPI^{representative}$ and the variation range range are combined with each other, and an evaluation KPI model $KPI^{eval}(x)$ is defined as in the following Equation (22).

$$KPI^{eval}(x) = KPI^{representative}(x) + \text{range}(x) \quad (22)$$

In the examples illustrated in FIGS. 14A-14B, both of a representative value and a variation range are preferably small, and thus the representative value and the variation range are added together to be combined in an additive manner. Both of a representative value and a variation range have positive values, and may thus be defined to be combined in an multiplicative manner.

According to the evaluation KPI model, a condition $C^{Best}$ making the evaluation KPI the minimum may be explored according to the following Equation (23).

$$C^{Best} = \arg\min_{x} KPI^{eval}(x) \quad (23)$$

The above exploration may also be performed in a case where the evaluation KPI best value is the maximum value.

A representative value of a KPI may be obtained in various methods, for example, by calculating a specific probability value such as a mean value, a most frequent value, or a median value, or by using regression statistics (regression line) based on a mathematical model. An upper value and a lower value indicating a variation range of a KPI may be obtained in various methods, for example, by calculating a standard deviation of KPIs in respective conditions, upper/lower standard deviations using upper and lower data with respect to representative values, or a KPI for a specific probability value in a probability distribution of the KPI.

<Evaluation KPI Setting Screen>

Figure 16:
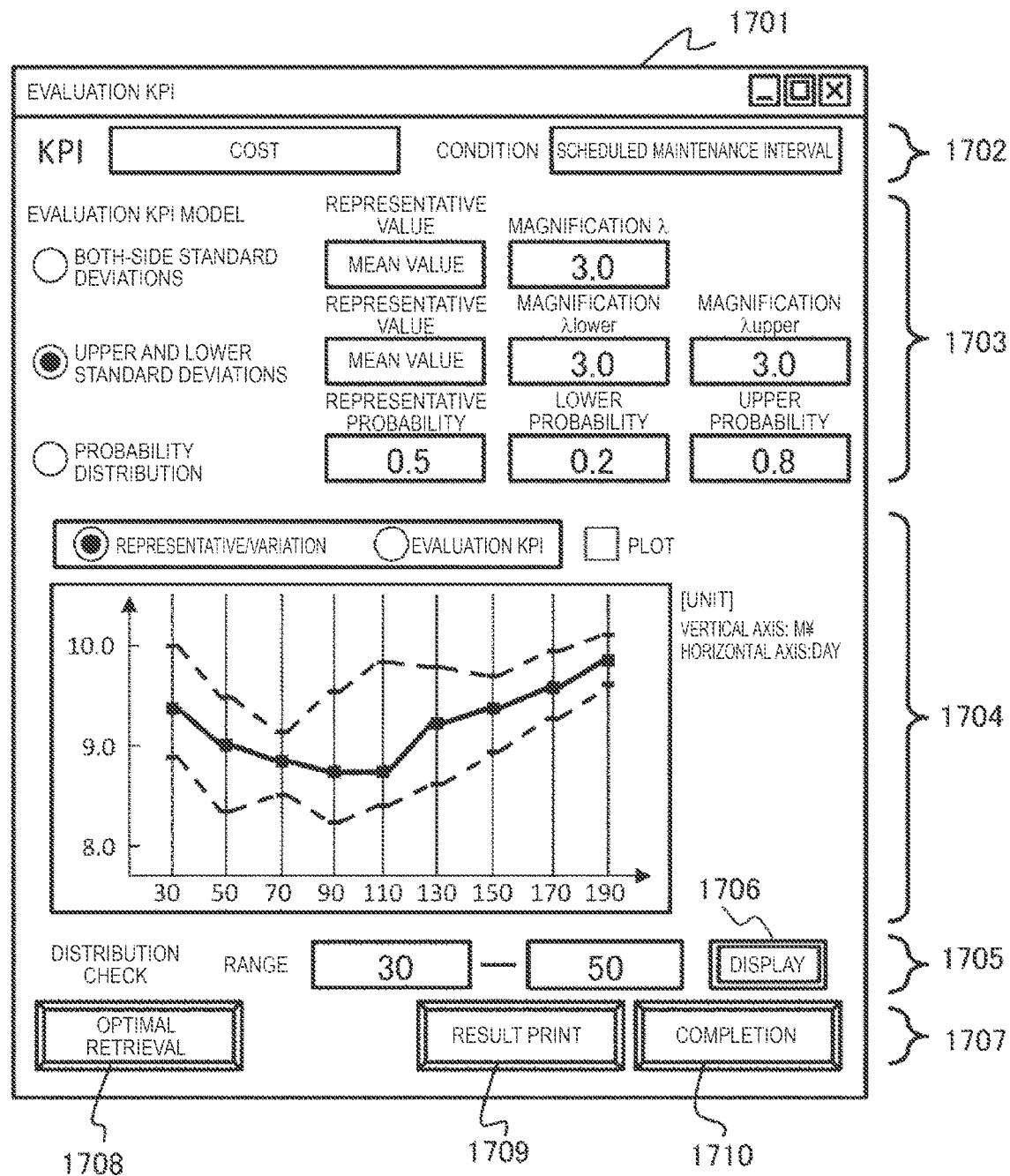
FIG. 16 is a diagram illustrating a display example of an evaluation KPI setting screen.

Next, FIG. 16 illustrates a display example of an evaluation KPI setting screen for an optimal condition exploration.

The evaluation KPI setting screen 1701 is displayed on the display by the display control unit 40 on the basis of an instruction from the condition setting portion 102. A user may perform settings regarding an evaluation KPI model on the evaluation KPI setting screen 1701.

The evaluation KPI setting screen 1701 is provided with a KPI/condition display field 1702, an evaluation KPI selection field 1703, a graph display field 1704, a distribution check field 1705, and an operation field 1707.

An item of a KPI (in a case of FIG. 16, cost) which is an evaluation target and a condition (in a case of FIG. 16, a scheduled maintenance interval) are displayed in the KPI/condition display field 1702.

In the evaluation KPI selection field 1703, any one of both-side standard deviations, upper and lower standard deviations, and a probability distribution may be selected as an evaluation KPI model from the viewpoint of a variation range by using a radio button.

In a case where the both-side standard deviations are selected, a mean value, a most frequent value, or a median value in a condition-KPI relationship model is selected as a representative value. A magnification of a standard deviation for determining a variation range is entered as a magnification $\lambda$.

In a case where the upper and lower standard deviations are selected, a mean value, a most frequent value, or a median value in a condition-KPI relationship model is selected as a representative value. An upper and lower magnifications of a standard deviation for determining a variation range are entered as a magnification $\lambda$.

In a case where the probability distribution is selected, cumulative probability values used as a representative value, an upper value, and a lower value are set.

In the graph display field 1704, representative/variation or an evaluation KPI may be selected as a display target by using a radio button. A scatter diagram of a KPI is drawn by checking a plot checkbox. A horizontal axis of the graph display field 1704 expresses an interval (unit: day) of scheduled maintenance, and a vertical axis expresses cost (unit: million yen (MY)).

In the distribution check field 1705, a range of a condition (in a case of FIG. 16, day) to be displayed to be enlarged in the graph displayed in the graph display field 1704 may be set. In a case where a user sets the range and presses a display button 1706, a KPI probability distribution screen 1721 (FIG. 17) is displayed. In a case of FIG. 16, the KPI probability distribution screen 1721 (FIG. 17) showing a distribution of KPIs for 30 to 50 days as a range of the condition is displayed.

The operation field 1707 is provided with an optimal exploration button 1708, a result print button 1709, and a completion button 1710. In a case where the user presses the optimal exploration button 1708, an optimal condition screen 1731 (FIG. 18) is displayed. In a case where the user presses the result print button 1709, a condition of a maintenance method making a KPI best is printed on paper. In a case where the user presses the completion button 1710, the evaluation KPI setting screen 1701 is closed.

Figure 17:
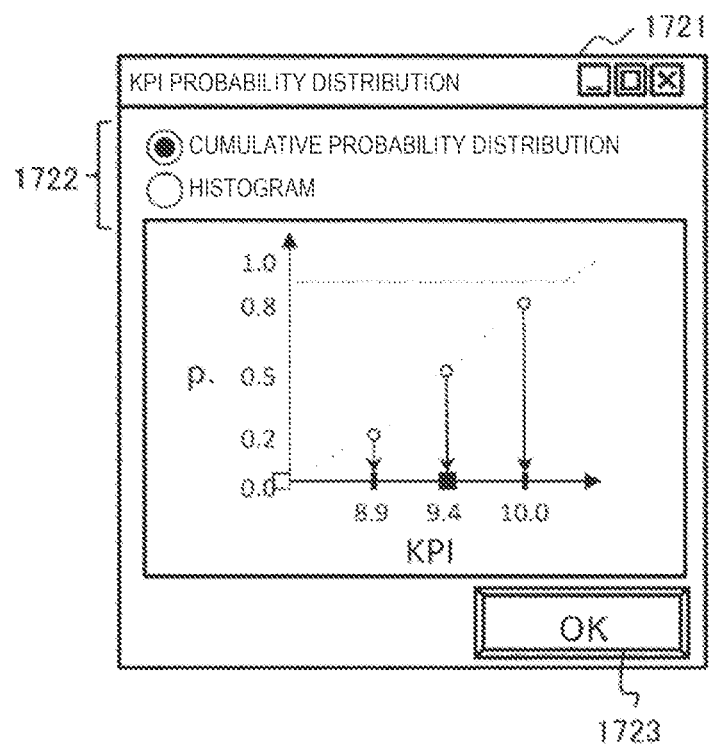
FIG. 17 is a diagram illustrating a display example of a KPI probability distribution screen.

FIG. 17 illustrates a display example of the KPI probability distribution screen 1721 displayed in response to pressing of the display button 1706 (FIG. 16).

A radio button for selecting a cumulative probability distribution or a histogram and an OK button 1723 are provided in the KPI probability distribution screen 1721. In a case where the user selects the cumulative probability distribution or the histogram in a selection field 1722, a display method of a distribution of KPIs in a range of a condition designated in the distribution check field 1705 (FIG. 16) is changed to the cumulative probability distribution or the histogram. In a case where the user presses the OK button 1723, the KPI probability distribution screen 1721 is closed.

Figure 18:
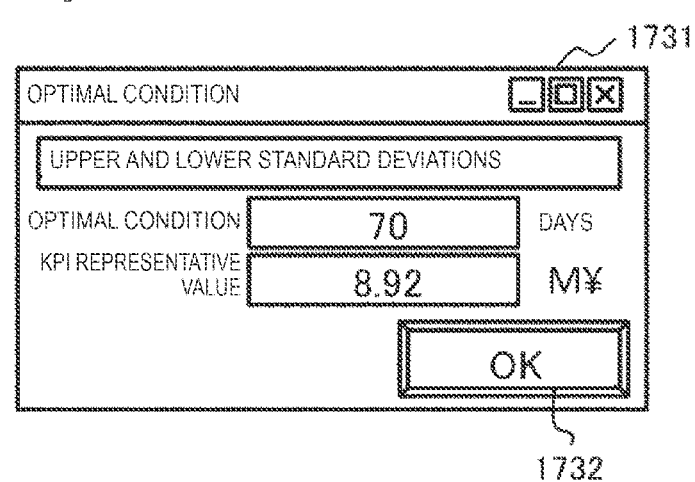
FIG. 18 is a diagram illustrating a display example of an optimal condition checking screen.

FIG. 18 illustrates a display example of the optimal condition screen 1731 displayed in response to pressing of the optimal exploration button 1708 (FIG. 16).

A selection (the both-side standard deviations, the upper and lower standard deviations, or the probability distribution) in the evaluation KPI selection field 1703 (FIG. 16), an optimal condition (in a case of FIG. 18, 70 days as a scheduled maintenance interval), and a KPI representative value (in a case of FIG. 18, 8.92 million yen (MY) as the best cost) are displayed on the optimal condition screen 1731. In a case where the user presses an OK button 1732 provided in the optimal condition screen 1731, the optimal condition screen 1731 is closed.

As an optimal condition, in addition to a scheduled maintenance interval, at least one of maintenance worker information (the number of maintenance workers), O&M asset possessing information (the number of facilities), and a failure probability may be displayed on the optimal condition screen 1731.

<Optimal Condition Exploration Method in Case Where Evaluation KPI Model is Defined by Using Standard Deviation for Variation Range of KPI>

In the above description, an evaluation KPI model has been defined by using a difference between an upper value and a lower value of a KPI for a variation range of the KPI. An evaluation KPI model may be defined by using a standard deviation for a variation range of a KPI.

Next, a description will be made of an optimal condition exploration method in a case where an evaluation KPI model is defined by employing a mean value or a regression statistic in a representative value of a KPI and using a standard deviation for a variation range of the KPI.

In a case where a mean value is employed in the representative value $KPI^{representative}$ of a KPI, a mean of KPIs under an identical condition may be taken as shown in the following Equation (24). In a case where conditions have identity, but the conditions are distributed in a continuous range, a condition may be determined by taking the vicinity of a certain condition value. A condition may be a discrete value such as an integer. A condition may be a classification item instead of a value. A domain may not be consecutive variables in order to explore the best KPI.

$$KPI^{representative}(x) = \frac{\sum_{i=1}^{\#_i KPI_i(x)} KPI_i(x)}{\#_i KPI_i(x)} \qquad (24)$$

\# in Equation (24) indicates an operation for obtaining the number of elements, and $\#_i KPI_i(x)$ indicates obtaining the number of pieces of KPI data for the condition x.

On the other hand, in a case where a regression statistic is employed in the representative value $KPI^{representative}$ of a KPI, a mathematical model for fitting (obtaining parameters of the mathematical model) is defined. In this case, since the minimum value or the maximum value of a KPI is desired to be obtained, a polynomial of a second order or more is used, but a formula obtained through a combination of a plurality of pieces of discrete data, such as a random forest regression model or a support vector regression model may be used, and a parametric or a nonparametric equation may be used. A mathematical model in which a single KPI is obtained for a single condition may be used. Hereinafter, the mathematical model is indicated by $f^{KPI}(x)$ In this case, the representative value $KPI^{representative}$ is an estimated value using the mathematical model $f^{KPI}(x)$ and is added with "estimated" indicating estimation as an upper right suffix as expressed in the following Equation (25).

$$KPI^{representative}(x)KPI^{estimated}(x)=f^{KPI}(x) \quad (25)$$

Figure 19:
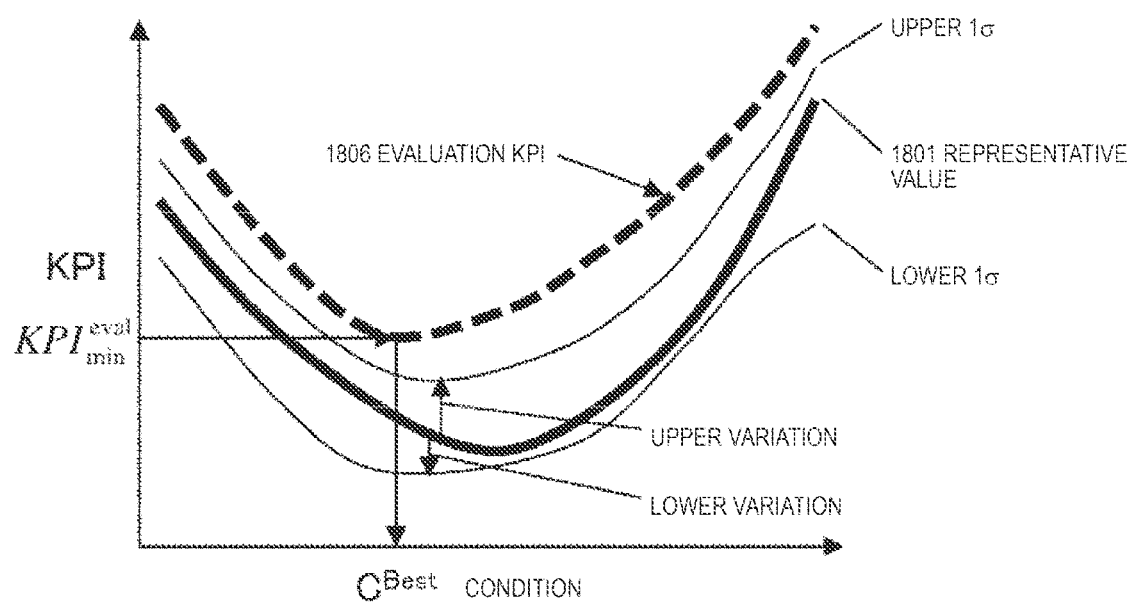
FIG. 19 is a diagram illustrating an example of a relationship among a regression/mean representative value, a standard deviation, and an evaluation KPI model.

FIG. 19 illustrates a relationship among the representative value $KPI^{representative}$ employing a mean value or a regression statistic, a standard deviation, and an evaluation KPI model.

As described above, a representative value curve 1801 indicating the representative value $KPI^{representative}$ may be obtained from Equation (24) or Equation (25). In a case where a mean value is employed, the representative value curve 1801 may be obtained by connecting mean values of KPIs for respective conditions to each other. A variation includes an upper variation and a lower variation with respect to the representative value curve 1801. In a case where an upper variation and a lower variation are not particularly differentiated from each other, a standard deviation $\sigma(x)$ for a condition may be obtained according to the following Equation (26).

$$\sigma(x) = \sqrt{\frac{\sum_{i=1}^{\#_i KPI_i(x)} (KPI_i(x) - KPI^{representative}(x))^2}{\#_i KPI_i(x)}} \quad (26)$$

In a case where an upper variation and a lower variation are obtained separately from each other, data of a KPI is divided into data pieces, and a standard deviation of each data piece is calculated, as shown in the following Equations (27) to (30).

$$KPI_i^{lower}(x) < KPI^{estimated}(x) \quad (27)$$

$$KPI_i^{upper}(x) > KPI^{estimated}(x) \quad (28)$$

$$n^{upper/lower} = \#_i KPI_i^{upper/lower}(x) \quad (29)$$

$$\sigma^{upper/lower}(x) = \sqrt{\frac{\sum_{i=1}^{n^{upper/lower}} \left(KPI_i^{upper/lower}(x) - KPI^{representative}(x)\right)^2}{n^{upper/lower}}} \quad (30)$$

"/" included in the suffix upper/lower in Equations (29) and (30) indicates an identical order between variables before and after "/". The sign of inequality in Equations (27) and (28) may include a sign of equality.

In FIG. 19, upper $1\sigma$ indicates $\sigma^{upper/lower}$, and lower $1\sigma$ indicates $-\sigma^{upper/lower}$. The variation range range, which is obtained by multiplying the magnification $\lambda$ by a standard deviation, is as shown in the following Equation (31) in a case where an upper variation and a lower variation is not differentiated from each other, and is as shown in the following Equation (32) in a case where an upper variation and a lower variation is differentiated from each other.

$$\text{range}(x)=\lambda\sigma(x) \quad (31)$$

$$\text{range}(x)=\lambda^{upper}\sigma^{upper}(x)+\lambda^{lower}\sigma^{lower}(x) \quad (32)$$

In a case where the representative value shown in Equation (25) and the variation range range shown in Equation (31) or Equation (32) are assigned to Equation (22) representing the evaluation KPI model, an evaluation KPI model 1806 indicated by a dashed line in FIG. 19 may be obtained.

An optimal condition $C^{BEST}$ based on the evaluation KPI model 1806 is expressed as shown in the following Equation (33).

$$C^{Best} = \arg\min_x KPI^{eval}(x) = \arg_x KPI^{eval}(x) \Big| KPI^{eval}(x) = KPI_{min}^{eval} \quad (33)$$

As mentioned above, a description has been made of an optimal condition exploration method in a case where an evaluation KPI model is defined by using a standard deviation for a variation range of a KPI.

<Optimal Condition Exploration Method in Case Where Evaluation KPI Model is Defined with Representative Value, Upper Value, or Lower Value as KPI for Specific Probability Value>

Next, a description will be made of an optimal condition exploration method in a case where an evaluation KPI model is defined with a representative value, an upper value, and a lower value as KPIs for a specific probability value.

First, with reference to FIGS. 20A-20c, a description will be made of meanings of a representative value, an upper value, and a lower value of KPIs for a specific probability value.

Figure 20A:
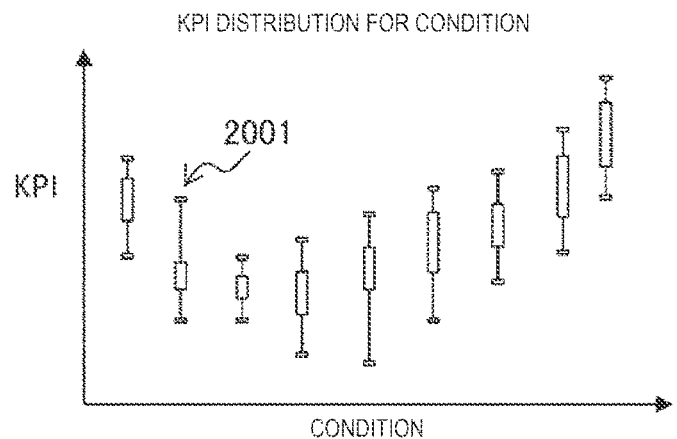
FIGS. 20A-20C are diagrams for explaining meanings of a representative value, an upper side value, and a lower side value of a KPI for a specific probability value.

FIG. 20(A) is a graph illustrating a distribution of KPIs for conditions. As illustrated in the graph, a KPI changes for a condition, and a KPI has a variation in a certain condition. The value indicates a distribution of the generation of data of a KPI, and a distribution 2001 indicates a variation of a KPI for a certain condition.

Figure 20B:
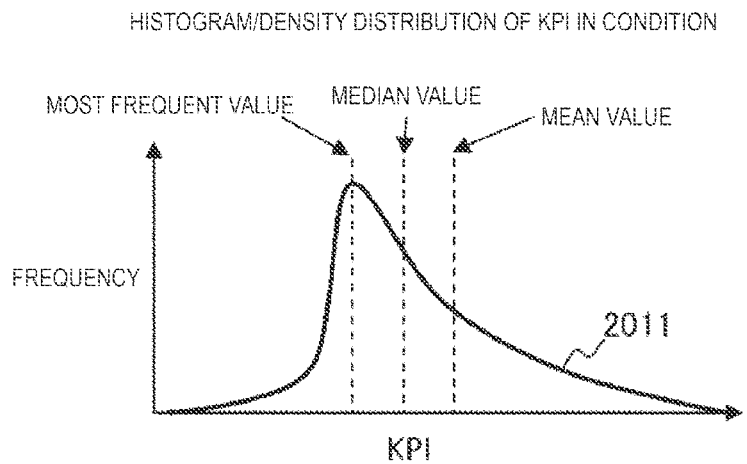

FIG. 20(B) indicates a frequency distribution (histogram) 2011 corresponding to the distribution 2001 in FIG. 20(A). The frequency distribution 2011 is a distribution having a bottom which is wide in a direction in which a KPI increases, a most frequent value is biased in a direction in which the KPI decreases in the frequency distribution 2011, and a mean value is biased in the direction in which the KPI increases.

Therefore, in a case where a KPI which is generated in many cases is desired to be known, a most frequent value may be evaluated. In a case where an expected KPI is desired to be known, a mean value may be evaluated.

In the evaluation KPI model shown in Equation (22), it is important to determine an upper range and a lower range of a distribution, and a representative value which is used as a reference for dividing the distribution into the upper side and the lower side. Regarding a standard deviation, in a case where a distribution is not a normal distribution, a mathematical model of a distribution is required to be determined with respect to a relationship between a standard deviation and a generated probability.

Therefore, in a case where a representative value, an upper value, and a lower value are directly set on the basis of a probability value, a relationship between a generated probability and a range becomes clear. A median value causing a cumulative generation probability to be 0.5 may be set as a representative value.

Figure 20C:
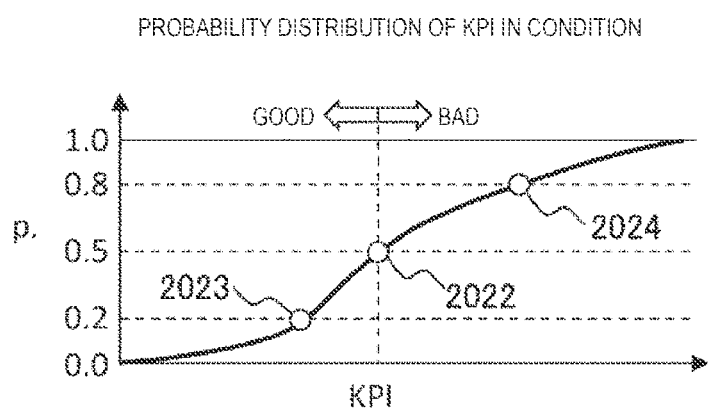

FIG. 20(C) is a graph illustrating a cumulative probability distribution of a KPI. A horizontal axis expresses a KPI, and a vertical axis expresses probability (p.). In the graph, a value on the horizontal axis of a plot 2022 where a probability is 0.5 is a median value of a KPI. In a case where a probability for determining a lower value is assumed to be 0.2, a value on the horizontal axis of a plot 2023 is a lower value of a KPI. In a case where a probability for determining an upper value is assumed to be 0.8, a value on the horizontal axis of a plot 2024 is an upper value of a KPI.

A KPI may be interpreted as a control limit when an O&M service is performed, and, in a case where the control limit is handled as ±2σ of a normal distribution by profiling quality control, an upper probability is 0.97725, and a lower probability is 0.02275. In a case where the control limit is handled as ±3σ of a normal distribution by profiling quality control, an upper probability is 0.99865, and a lower probability is 0.00135. An easily understood value may be set, and, for example, 0.9, 0.95, or 0.99 may be set as an upper probability.

Next, a description will be made of a distribution of KPIs for probability values in respective conditions with reference to FIGS. 21A-21B.

Figure 21A:
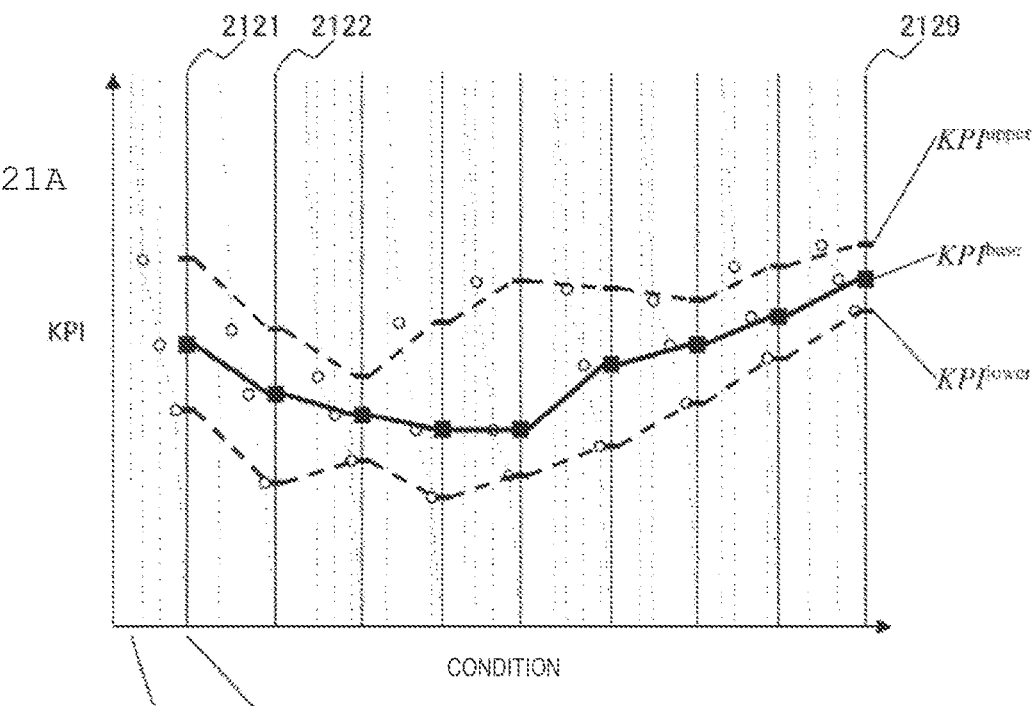
FIGS. 21A-21B are diagrams illustrating an example of a distribution for a condition, of a KPI for a probability value in each condition.

FIG. 21(A) is a graph illustrating a distribution of KPIs for probability values in respective conditions, and a horizontal axis thereof expresses a condition, and a vertical axis thereof expresses a KPI. The respective conditions are indicated by vertical lines 2121, 2122, and the like, and a representative value $KPI^{base}$, an upper value $KPI^{upper}$, and a lower value $KPI^{lower}$ of a KPI are plotted on the vertical line.

Figure 21B:
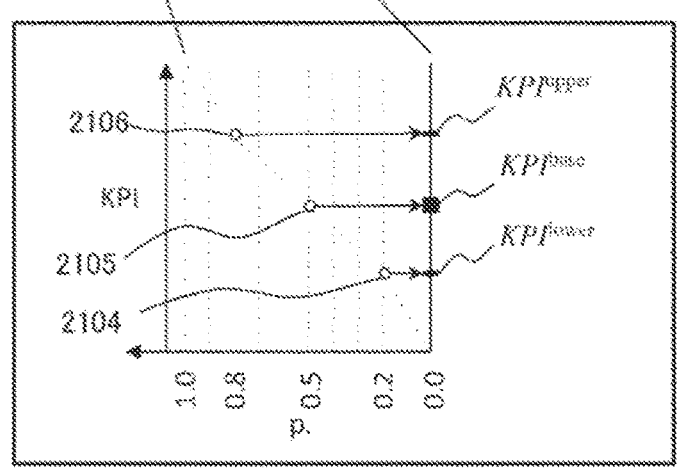

FIG. 21(B) illustrates, as a cumulative probability distribution, a relationship among the representative value, the upper value, and the lower value in the vertical line condition 2121 in the graph in FIG. 21(A). A horizontal axis in FIG. 21(B) expresses a probability p. which increases toward the left, and a vertical axis thereof expresses a KPI.

As illustrated in FIG. 21(B), in a case where probabilities for a lower limit value, a representative value, and an upper limit value are respectively set to be 0.2, 0.5, and 0.8, plots 2104 to 2106 may be obtained, and thus the lower value $KPI^{lower}$, the representative value $KPI^{base}$, and the upper value $KPI^{upper}$ may be obtained. In the same manner as for other conditions, the lower value $KPI^{lower}$, the representative value $KPI^{base}$ and the upper value $KPI^{upper}$ may be obtained.

In a case where the representative values $KPI^{base}$ in the respective conditions are connected to each other via a line segment, a graph for the representative value $KPI^{base}$ may be obtained. Similarly, a graph for the lower value $KPI^{lower}$ and a graph for the upper value $KPI^{upper}$ may be obtained. A representative value and a variation range obtained in the above-described way are respectively as shown in the following Equations (34) and (35).

$$KPI^{representative}(x)=KPI^{base}(x) \quad (34)$$

$$range(x)=KPI^{upper}(x)-KPI^{lower}(x) \quad (35)$$

As shown in the following Equations (36) and (37), a relationship between a probability value and a KPI is determined by a distribution function $F_{KPI}(KPI|x)$, and $KPI_p$ giving a probability p may be obtained by using an inverse function of the distribution function.

$$P|_x = F_{KPI}(KPI|x) \quad (36)$$

$$KPI_p(x) = F_{KPI}^{-1}(p|x) \quad (37)$$

In a case where data of a KPI is used, the data of a KPI may be sorted in an increasing order, numbers in an increasing order may be divided by the number of pieces of data so as to be used as a probability value, and a KPI with the probability value may be obtained. In a case where probabilities for a representative value, a lower value, and an upper value are respectively indicated by phase, $p^{lower}$, and $p^{upper}$, KPIs therefor may be expressed as in the following Equations (38) to (40).

$$KPI^{base}(x)=KPI_{p^{base}}(x) \quad (38)$$

$$KPI^{lower}(x)=KPI_{p^{lower}}(x) \quad (39)$$

$$KPI^{upper}(x)=KPI_{p^{upper}}(x) \quad (40)$$

A case of the example illustrated in FIG. 21(B) leads to $KPI^{base}(x)=KPI_{0.5}(x)$, $KPI^{lower}(x)=KPI_{0.2}(x)$, and $KPI^{upper}(x)=KPI_{0.8}(x)$.

As mentioned above, a description has been made of an optimal condition exploration method in a case where an evaluation KPI model is defined with a representative value, an upper value, and a lower value as KPIs for a specific probability value.

<Summary>

Figure 22:
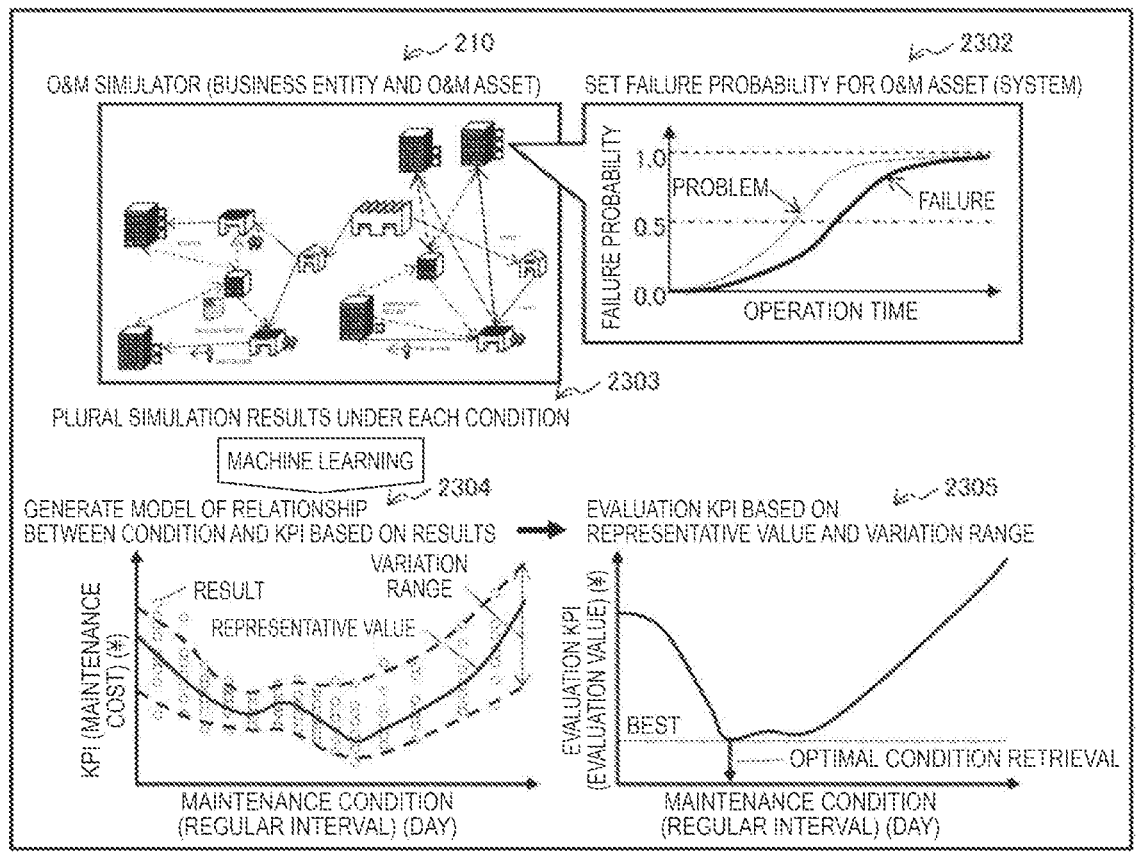
FIG. 22 is a diagram for explaining a conclusion of the embodiment according to the present invention.

Finally, with reference to FIG. 22, a description will be made of a summary of a process of obtaining a condition of a maintenance method making a KPI best in a case where various maintenance methods are applied to an operation of an O&M asset in the maintenance planning apparatus 1 according to an embodiment of the present invention.

Various business entities related to O&M service business and an operated O&M asset are set as agents for the O&M service simulator (a business entity or an O&M asset) 210.

The business entities are a customer company which makes profits by operating an O&M asset, a maintenance business entity which performs maintenance of the O&M asset, a diagnosis service company which monitors the O&M asset so as to perform anomaly detection and diagnosis, and a parts business entity which supplies maintenance parts. The O&M asset may be a facility provided in a building or a moving object such as a truck performing transportation.

A configuration of a business entity or an O&M asset may be variously set, and a condition regarding an O&M service such as an interval of scheduled maintenance or the number of maintenance workers may also be variously set. A maintenance method may be set to various methods such as scheduled maintenance, a repair (breakdown maintenance), condition-based maintenance, and predictive maintenance, and parallel methods may also be employed.

A problem or a failure in an O&M asset does not necessarily occur at a fixed time but accidentally. In other words, a problem or a failure occurs in a probabilistic manner. Therefore, the O&M service simulator 210 determines the occurrence of a problem or a failure on the basis of a random number by using a failure rate. A failure rate differs depending on an O&M asset and a structure of a system thereof, and thus the failure rate is defined by using a piecewise linear failure rate model in which a change in various failure rates for an operation time can be expressed. The failure rate is a failure probability per unit time.

In order for a person to perform setting on the basis of data, the person can more easily understand a failure probability for an operation time, that is, management of a proportion of failed assets to all assets than a failure rate. The piecewise linear failure rate model is obtained on the basis of a failure probability. Therefore, a failure rate of an O&M asset, which is one of simulation conditions, is calculated on the basis of a failure probability set by a user. In other words, a condition of the occurrence of a problem or a failure in an O&M simulator is based on setting 2302 of a failure rate for an O&M asset (system).

In a case where maintenance of an asset is planned, a condition making a KPI such as a business profit or cost best is desired to be found by comparing various conditions with each other. Therefore, simulation is executed under respective conditions, and results thereof are compared with each other. The occurrence of a problem or a failure is probabilistic even under an identical condition, and thus simulation is executed a plurality of times under an identical condition. A condition making a KPI best is found from a plurality of simulation results 2303 under the respective conditions. This process is an optimal condition exploration.

Next, a model 2304 indicating a relationship between a condition and a KPI is generated by using machine learning on the basis of the plurality of simulation results 2303 under the respective conditions. In a graph indicating the model, a condition is set to a scheduled maintenance interval of a maintenance condition, a KPI is set to maintenance cost, a horizontal axis expresses the condition, and a vertical axis expresses the KPI, and the results are plotted. A representative value and a variation range are obtained by using a KPI relationship model. The representative value is a value used as a reference, and preferably becomes smaller in a case of cost. A variation is a risk of loss occurrence, and, if the variation is great, a great loss may occur.

Next, an evaluation KPI 2305 is defined by using the representative value and the variation range. The evaluation KPI is generated as a single index by combining the representative value with the variation range. In a case where a KPI is cost, the representative value preferably becomes smaller, and the variation range preferably becomes narrower, and thus the minimum evaluation KPI is best. If a maintenance condition in this case is explored, an optimal condition may be obtained.

The above description relates to a summary of a process of obtaining a condition of a maintenance method making a KPI best in a case where various maintenance methods are applied to an operation of an O&M asset in the maintenance planning apparatus 1.

<Configuration for Realizing Maintenance Planning Apparatus 1 by Using Software>

Meanwhile, the maintenance planning apparatus 1 may be configured with hardware, and may be realized by software. In a case where the maintenance planning apparatus 1 is realized by software, a program configuring the software is installed in a computer. Here, the computer includes a computer incorporated into dedicated hardware, and, for example, a general purpose personal computer which can execute various functions as a result of various programs being installed therein.

Figure 23:
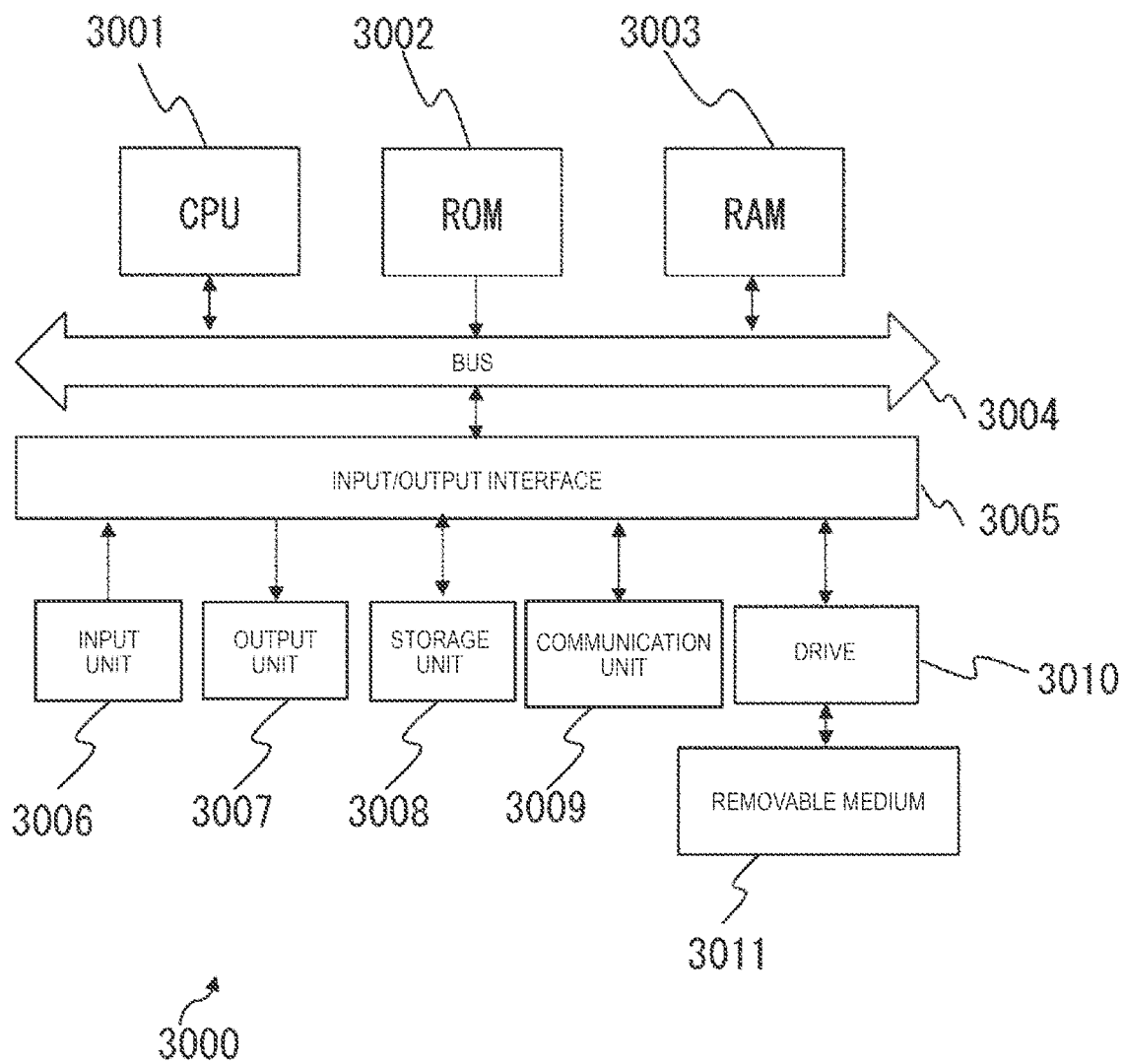
FIG. 23 is a block diagram illustrating a configuration example of a computer.

FIG. 23 is a block diagram illustrating a hardware configuration example of a computer in which the maintenance planning apparatus 1 is realized by a program.

In this computer 3000, a central processing unit (CPU) 3001, a read only memory (ROM) 3002, and a random access memory (RAM) 3003 are connected to each other via a bus 3004.

The bus 3004 is further connected to an input/output interface 3005. The input/output interface 3005 is connected to an input unit 3006, an output unit 3007, a storage unit 3008, a communication unit 3009, and a drive 3010.

The input unit 3006 is configured with a keyboard, a mouse, a microphone, or the like. The output unit 3007 is configured with a display, a speaker, or the like. The storage unit 3008 is configured with a hard disk, a nonvolatile memory, or the like. The communication unit 3009 is configured with a network interface, or the like. The drive 3010 drives a removable medium 3011 such as a magnetic disk, an optical disc, a magnetooptical disk, or a semiconductor memory.

In the computer 3000 configured in the above-described way, the CPU 3001 loads, for example, a program stored in the storage unit 3008 to the RAM 3003 via the input/output interface 3005 and the bus 3004, and executes the program, and thus the control unit 10, the simulation execution unit 20, the analysis unit 30, and the display control unit 40 which are constituent elements of the maintenance planning apparatus 1 illustrated in FIG. 1 are realized.

The program executed by the computer 3000 (CPU 3001) may be recorded on the removable medium 3011 such as a package medium, so as to be provided. The program may be provided via a wired or wireless transmission medium such as a local area network, the Internet, or a digital satellite broadcast.

In the computer 3000, the program may be installed in the storage unit 3008 via the input/output interface 3005 by attaching the removable medium 3011 to the drive 3010. The program may be received by the communication unit 3009 via a wired or wireless transmission medium so as to be installed in the storage unit 3008. The program may be installed in the ROM 3002 or the storage unit 3008 in advance.

The program executed by the computer 3000 may be a program for performing processes in a time series according to the order described in the present specification, and may be a program for performing processes in parallel or at a necessary timing such as the time at which the program is called.

The effects described in the present specification are only examples, and are not limited, and other effects may be achieved.

The present invention is not limited to the above-described embodiments, and includes various modification examples. For example, each of the embodiments has been described in detail for better understanding of the present invention, and the present invention is not limited to necessarily including all of the above-described constituent elements. Some configurations of a certain embodiment may be replaced with configurations of another embodiment, and configurations of another embodiment may be added to configurations of a certain embodiment. The configurations of other embodiments may be added to, deleted from, and replaced with some of the configurations of each embodiment.

Some or all of the above-described respective configurations, functions, processing units, and the like may be designed as, for example, integrated circuits so as to be realized in hardware. The above-described respective configurations and functions may be realized in software by a processor interpreting and executing a program for realizing each function. Information regarding a program, a table, a file, and the like for realizing each function may be stored in a recording device such as a memory, a hard disk, or a solid state drive (SSD), or a recording medium such as an IC card, an SD card, or a DVD. A control line or an information line which is necessary for description is illustrated, and all control lines or information lines on a product may not necessarily be illustrated. Actually, it may be considered that almost all of the configurations are connected to each other.

The present invention may be provided not only as a maintenance planning apparatus and a maintenance planning method but also in various aspects such as a system configured with a plurality of apparatus or a computer readable program.

REFERENCE SIGNS LIST

1 MAINTENANCE PLANNING APPARATUS
10 CONTROL UNIT
11 CONDITION DATA

20 SIMULATION EXECUTION UNIT
30 ANALYSIS UNIT
31 OPTIMAL CONDITION DATA
32 GRAPH DATA
33 ANIMATION DATA
40 DISPLAY CONTROL UNIT
41 GRAPH DRAWING PORTION
42 ANIMATION DRAWING PORTION
101 PROCESS EXECUTION PORTION
102 CONDITION SETTING PORTION
103 KPI COMPUTATION PORTION
104 FAILURE RATE CALCULATION PORTION
210 SERVICE SIMULATOR
211 CONDITION ACQUISITION PROCESSING SECTION
212 ASSET DETERIORATION/SIGNAL GENERATION/FAILURE RATE/FAILURE PROCESSING SECTION
213 ANOMALY DETECTION/DIAGNOSIS PROCESSING SECTION
214 CUSTOMER TASK SCHEDULE PLAN PROCESSING SECTION
215 CUSTOMER TASK EXECUTION PROCESSING SECTION
216 REPAIR TASK SCHEDULE PLAN PROCESSING SECTION
217 REPAIR TASK EXECUTION PROCESSING SECTION
218 PARTS SUPPLY/INVENTORY MANAGEMENT PROCESSING SECTION
220 STORAGE PORTION
302 BUILDING
303 FACILITY
304 MAINTENANCE SERVICE COMPANY
305 MAINTENANCE WORKER
306 DIAGNOSIS SERVICE COMPANY
307 WAREHOUSE
308 MANUFACTURER
316 DIAGNOSIS REPORT
1301 FAILURE PROBABILITY SETTING SCREEN
1302 TABLE SETTING FIELD
1303 ADD BUTTON
1304 DELETE BUTTON
1305 CHECKBOX
1306 OPERATION FIELD
1307 SETTING CHECK BUTTON
1308 CANCEL BUTTON
1309 OK BUTTON
1311 FAILURE PROBABILITY SETTING SCREEN
1312 DRAWING SETTING FIELD
1313 SCALE ADJUSTMENT FIELD
1314 OPERATION FIELD
1315 SETTING CHECK BUTTON
1316 CANCEL BUTTON
1317 OK BUTTON
1452 CONDITION-KPI RELATIONSHIP MODEL
1701 EVALUATION KPI SETTING SCREEN
1702 CONDITION DISPLAY FIELD
1703 SELECTION FIELD
1704 GRAPH DISPLAY FIELD
1705 DISTRIBUTION CHECK FIELD
1706 DISPLAY BUTTON
1707 OPERATION FIELD
1708 OPTIMAL EXPLORATION NUMBER
1709 RESULT PRINT BUTTON
1710 COMPLETION BUTTON
1721 KPI PROBABILITY DISTRIBUTION SCREEN
1722 SELECTION FIELD
1723 OK BUTTON
1731 OPTIMAL CONDITION SCREEN
1732 OK BUTTON
3000 COMPUTER
3001 CPU
3002 ROM
3003 RAM
3004 BUS
3005 INPUT/OUTPUT INTERFACE
3006 INPUT UNIT
3007 OUTPUT UNIT
3008 STORAGE UNIT
3009 COMMUNICATION UNIT
3010 DRIVE
3011 REMOVABLE MEDIUM

The invention claimed is:
1. A maintenance planning computer-based apparatus comprising:
a computer processor; and
at least one non-transitory storage medium storing at least one program that when executed by the processor configures the computer-based apparatus to perform the steps of:
storing, as information which are condition values, business entity information regarding a business entity including a customer company and a maintenance company, possessing information regarding an operation & maintenance (O&M) asset possessed by the customer company, configuration information regarding a configuration of the O&M asset possessed by the customer company, and maintenance method information regarding a maintenance method for the O&M asset;
storing a plurality of failure probability values for the O&M asset, said plurality of failure probability values being set by a user;
associating each of the plurality of failure probability values with one of a plurality of time values;
generating a failure rate model for the O&M asset on the basis of the plurality of failure probability values and the plurality of time values;
executing a plurality of failure simulations for the O&M asset based on one or more of a plurality of different condition values and the failure rate model;
computing a plurality of key performance indicators (KPIs) based on results of the failure simulations, each key performance indicator (KPI) corresponding to one of each of the plurality of different condition values; and
determining an optimal condition based on the plurality of different condition values and corresponding plurality of KPIs, said optimal condition corresponding to a best KPI,
wherein a condition-KPI relationship model is defined through machine learning using the plurality of different condition values and the corresponding plurality of KPIs,
wherein the optimal condition is determined on the basis of the condition-KPI relationship model, and
wherein the apparatus has
a first function of setting configurations of the business entity, the O&M asset, and a maintenance worker,
a second function of setting a system of the O&M asset,
a third function of defining a system state and anomaly detection, a fourth function of planning a schedule of a customer task indicating an operation of the O&M asset which is work of the customer company and a schedule of a repair task indicating a repair of the O&M asset which is work of a maintenance service company, and performing the tasks, a fifth function of defining the customer task and the repair task for the business entity, a sixth function of performing the repair task, and a seventh function of managing, supplying, and procuring parts used for maintenance.

2. The maintenance planning computer-based apparatus according to claim 1, wherein the step of computing a plurality of KPIs includes the step of determining the KPIs based at least in part on values associated with an operation rate of the O&M asset, profits obtained through an operation, and cost required for maintenance.

3. The maintenance planning computer-based apparatus according to claim 1, further comprising:

a display control unit that displays the best KPI and the determined optimal condition.

4. The maintenance planning computer-based apparatus according to claim 3, wherein the display control unit displays at least one of a cycle of maintenance, the number of maintenance workers, the number of O&M assets, and failure probability information as the determined optimal condition.

5. The maintenance planning computer-based apparatus according to claim 1, wherein a representative value and a variation of the KPIs is specified on the basis of the condition-KPI relationship model, and wherein the optimal condition is determined on the basis of the representative value and the variation of the KPIs.

6. The maintenance planning computer-based apparatus according to claim 5, wherein an evaluation KPI model is defined by combining the representative value and the variation of the KPIs with each other, and wherein the optimal condition is determined on the basis of the evaluation KPI model.

7. The maintenance planning computer-based apparatus according to claim 6, wherein the variation of the KPIs is specified on the basis of a standard deviation of the KPIs.

8. The maintenance planning computer-based apparatus according to claim 6, wherein the variation of the KPIs is specified on the basis of a probability distribution of the KPIs.

9. The maintenance planning computer-based apparatus according to claim 1, wherein a piecewise linear failure rate model is generated based on a failure probability at a start point of a segment which is a temporal section of an operation time of the O&M asset, set by the user.

10. The maintenance planning computer-based apparatus according to claim 9, wherein generating the failure rate model including generating the piecewise linear failure rate model is based on an initial value of a failure rate.

11. The maintenance planning computer-based apparatus according to claim 9, wherein generating the failure rate model including generating the piecewise linear failure rate model is based on a constant failure rate.

12. The maintenance planning computer-based apparatus according to claim 1, wherein generating the failure rate model involves generating a piecewise Weibull failure rate model in which an operation time of the O&M asset is divided into segments and which is based on a Weibull distribution in each segment.

13. The maintenance planning computer-based apparatus according to claim 1, wherein the maintenance method information for the O&M asset includes four types of maintenance method information, including:

scheduled maintenance of planning and performing maintenance periodically at a predetermined interval, a repair in which the O&M asset is recovered to be operable according to the occurrence of a failure, condition-based maintenance which is planned and performed according to a result of comparison between a state amount and a control limit of the O&M asset, and predictive maintenance which is planned and performed according to a result of comparison between a signal value detected from the O&M asset and a threshold value.

14. A maintenance planning method performed by a computer processor and at least one non-transitory storage medium storing at least one program that when executed by the processor configures the computer to perform method steps, said steps comprising:

storing, as information which are condition values, business entity information regarding a business entity including a customer company and a maintenance company, possessing information regarding an operation & maintenance (O&M) asset possessed by the customer company, configuration information regarding a configuration of the O&M asset possessed by the customer company, and maintenance method information regarding a maintenance method for the O&M asset;

storing a plurality of failure probability values for the O&M asset, said plurality of failure probability values being set by a user;

associating each of the plurality of failure probability values with one of a plurality of time values;

generating a failure rate model for the O&M asset on the basis of the plurality of failure probability values and the plurality of time values;

executing a plurality of failure simulations for the O&M asset based on one or more of a plurality of different condition values and the failure rate model;

computing a plurality of key performance indicators (KPIs) based on results of the failure simulations, each key performance indicator (KPI) corresponding to one of each of the plurality of different condition values; and determining an optimal condition based on the plurality of different condition values and corresponding plurality of KPIs, said optimal condition corresponding to a best KPI;

setting configurations of the business entity, the O&M asset, and a maintenance worker;

setting a system of the O&M asset;

defining a system state and anomaly detection;

planning a schedule of a customer task indicating an operation of the O&M asset which is work of the customer company and a schedule of a repair task indicating a repair of the O&M asset which is work of a maintenance service company, and performing the tasks;

defining the customer task and the repair task for the business entity;

performing the repair task; and managing, supplying, and procuring parts used for maintenance, wherein a condition-KPI relationship model is defined through machine learning using the plurality of different condition values and the corresponding plurality of KPIs, and wherein the optimal condition is determined on the basis of the condition-KPI relationship model.

\* \* \* \* \*